United States Patent
Takeuchi et al.

(10) Patent No.: US 6,755,176 B2
(45) Date of Patent: Jun. 29, 2004

(54) FUEL INJECTION CONTROL SYSTEM FOR ENGINE

(75) Inventors: Katsuhiko Takeuchi, Chiryu (JP); Yoshimitsu Takashima, Anjo (JP); Taiyo Hiroi, Kariya (JP); Manabu Yoshidome, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/373,716

(22) Filed: Feb. 27, 2003

(65) Prior Publication Data

US 2003/0164166 A1 Sep. 4, 2003

(30) Foreign Application Priority Data

Mar. 1, 2002 (JP) ..................................... 2002-056492

(51) Int. Cl.$^7$ .............................. F02B 3/04; F02D 41/16
(52) U.S. Cl. .................. 123/299; 123/674; 123/339.12; 123/436
(58) Field of Search ................................ 123/299, 300, 123/304, 305, 339.1, 339.12, 339.29, 435, 436, 674, 675, 339.19; 701/103, 104, 105, 109, 111

(56) References Cited

U.S. PATENT DOCUMENTS

| | | | | |
|---|---|---|---|---|
| 3,575,146 A | * | 4/1971 | Creighton et al. | 123/299 |
| 5,507,260 A | * | 4/1996 | Hintzen | 123/299 |
| 5,647,317 A | * | 7/1997 | Weisman et al. | 123/299 |
| 6,328,014 B1 | * | 12/2001 | Bradshaw | 123/300 |
| 6,386,177 B2 | * | 5/2002 | Urushihara et al. | 123/299 |

FOREIGN PATENT DOCUMENTS

| | | |
|---|---|---|
| EP | 1245809 A2 | 10/2002 |
| JP | 2-23252 | 1/1990 |
| JP | 2001-355500 | 12/2001 |

* cited by examiner

*Primary Examiner*—Willis R. Wolfe
(74) *Attorney, Agent, or Firm*—Nixon & Vanderhye P.C.

(57) ABSTRACT

A fuel injection is carried out as n split injections. Each of injection quantities is defined by dividing an injection quantity into n fuel injections. A FCCB correction and an ISC correction are carried out while n split injection cycles are performed. A value obtained by adding up an FCCB correction for each injection cycle and an ISC correction for each injection cycle is updated and stored as a learned injection quantity. The learned injection quantity is calculated as an injection quantity correction for each cylinder to be added to a command injection quantity for each injection cycle.

26 Claims, 19 Drawing Sheets

FIG. 8

| Pfin | INJ | INTERVAL | | | | TFIN | ISC NE | BOOST | EGR | THROTTLE | SCV |
|---|---|---|---|---|---|---|---|---|---|---|---|
| | | QP1-2 | QP2-3 | QP3-4 | QP4-5 | | | | | | |
| A | 5 | 10 | 11 | 12 | 13 | TDC | 750 | 760 | None | Open | Open |
| B | 5 | ← | ← | ← | ← | TDC | ← | ← | ← | ← | ← |
| C | 5 | ← | ← | ← | ← | TDC | ← | ← | ← | ← | ← |
| D | 5 | ← | ← | ← | ← | TDC | ← | ← | ← | ← | ← |
| E | 5 | ← | ← | ← | ← | TDC | | | | | ← |

CORRECTED PART
BASE PART

| INJECTION | CONTROL |
|---|---|
| #1 ╱╲╲╲╲╲ #3 ╱╲╲╲╲╲ #4 ╱╲╲╲╲╲ #2 ╱╲╲╲╲╲ | QPL1 QPL2 QPL3 Qmain Qfup<br><br>QPL1=QPL2=QPL3=Qmain=Qfup<br>=totalQ/5 |

| INJECTION | CONTROL |
|---|---|
| #1 ╱╲╲╲╲╲ QISC+ΔQc1<br>#3 ╱╲╲╲╲╲ QISC−ΔQc3<br>#4 QISC+ΔQc4 ╱╲╲╲╲╲<br>#2 QISC−ΔQc2 ╱╲╲╲╲╲ | NE, TARGET, FCCB, ISC, STABLE CONDITION, TIME |

|  | #1 | #3 | #4 | #2 |
|---|---|---|---|---|
| AMPa |  |  |  |  |
| BMPa |  |  |  |  |
| CMPa |  |  |  |  |
| DMPa |  |  |  |  |
| EMPa |  |  |  |  |

|       | #1 | #3 | #4 | #2 |
|-------|----|----|----|----|
| 35MPa | A  |    |    |    |
| 55MPa |    |    |    |    |
| 85MPa |    |    |    |    |

|       | #1 | #3 | #4 | #2 |
|-------|----|----|----|----|
| 35MPa | B  |    |    |    |
| 55MPa |    |    |    |    |
| 85MPa |    |    |    |    |

|       | #1 | #3 | #4 | #2 |
|-------|----|----|----|----|
| 35MPa | C  |    |    |    |
| 55MPa |    |    |    |    |
| 85MPa |    |    |    |    |

FUEL INJECTION CONTROL SYSTEM FOR ENGINE

CROSS REFERENCE TO RELATED APPLICATIONS

This application is based on Japanese Patent Application No. 2002-56492 filed on Mar. 1, 2002 the contents of which are incorporated herein by reference.

BACKGROUND OF THE INVENTION

1. Field of the Invention

The present invention relates to a fuel injection quantity controller for an internal combustion engine. More specifically, the present invention relates to a pilot injection quantity controller for an internal combustion engine, capable of driving a fuel injector a plurality of times while the engine is in a compression stroke to inject a small quantity of fuel at least once for pilot injection before main injection.

2. Description of Related Art

A conventional common rail type fuel injection system injects a high-pressure fuel stored in a common rail under pressure into the cylinders of a multi-cylinder diesel engine. This common rail type fuel injection system performs pilot injection several times prior to main injection that makes the engine produce torque to reduce combustion noise and engine vibrations by stabilizing combustion from the start of main injection and to improve the quality of the exhaust gas.

Usually, the variation of an actual injection quantity in an injection command pulse time (TQ pulse width) for which the fuel injector injects fuel is corrected by individually adjusting the fuel injectors of the cylinders. Since the pilot injection quantity is as small as 5 $mm^3$/st, the pilot injection cannot achieve its purpose satisfactorily due to the variation of the actual injection quantity in the injection command pulse time, and the failure of pilot injection or injection of an excessive quantity of the fuel due to the deterioration of the ability of the fuel injector resulting from the secular change of injection quantity. The actual injection quantity injected by the fuel injector in the injection command pulse time tends to vary in a wide range when the injection pressure is high. Thus, it is very difficult to guarantee the performance of the fuel injector when the injection quantity is as small as on the order of 1 $mm^3$/st.

An inter-cylinder engine speed variation injection quantity correcting technique (FCCB) has been proposed to solve the foregoing problems. Application of this correcting technique is limited only to the correction of fuel injection pressure during idling, and this correcting technique cannot achieve correct correction of fuel injection pressure while the vehicle is running and when fuel injection pressure is high.

A method of proportionally distributing an injection quantity correction to two injection cycles, i.e., a pilot injection cycle and a main injection cycle is proposed in JP-A 2-23252. Application of this method, similarly to that of the foregoing known technique, is limited to the correction of fuel injection pressure during idling, and this method is unable to achieve accurate correction. Since this method distributes an injection quantity correction to the pilot injection cycle and the main injection cycle in proportion to the ratio of a pilot injection quantity to a total injection quantity and the ratio of a main injection quantity to the total injection, quantity, respectively, the method determines an estimated fuel injection quantity correction and is unable to quantitatively determine the divergence of an injection quantity relative to an injection command pulse time for the injector.

SUMMARY OF THE INVENTION

It is an object of the present invention to provide an injection quantity controller for an internal combustion engine, capable of quantitatively determining an actual injection quantity to be injected in an injection command pulse time by an injector.

According to a first aspect of the present invention, an injection quantity controller for an internal combustion engine calculates a learning control mode injection quantity according to the operating condition of the engine when learning executing conditions dependent on a predetermined operating condition of the engine or operating conditions for the engine are valid, substantially uniformly divides the learning control mode injection quantity by n, achieves inter-cylinder engine speed variation correction for individually correcting injection quantities for cylinders to smooth engine speed variation in each cylinder by measuring engine speed variation in each cylinder while n split injection cycles are performed, and comparing the engine speed variations in all the cylinders with a mean value, and achieves mean engine speed correction by measuring the mean engine speed while the n injection cycles are performed, and uniformly correcting the injection quantities for all the cylinders so that the mean engine speed is maintained at the desired engine speed for mean engine speed correction.

Furthermore, the injection quantity controller calculates, for each cylinder, a first injection quantity correction corresponding to the deviation of a measured engine speed variation in each cylinder from a mean engine speed variation of engine speed variations in all the cylinders, calculates a uniform second injection quantity correction for all the cylinders necessary to maintain the mean engine speed at the desired engine speed, and adds up a value obtained by dividing the first injection quantity correction for each cylinder by n and a value obtained by dividing the uniform second injection quantity correction for all the cylinders by n. Thus, the difference between an actual injection quantity and an injection quantity to be injected by the injector in the command injection pulse time, and the deterioration of the performance of each injector due to the secular change of injection quantity can be quantitatively determined for each cylinder. The relation between an ideal command injection pulse time and an injection quantity can be determined by adding up and storing the difference and the learned value learned by the preceding learning cycle as a learned fuel injection quantity for each cylinder.

The present invention may be implemented in the following manner.

The first and the second correction calculating means calculate the first injection quantity correction for each cylinder and the uniform second injection quantity correction for all the cylinders for a plurality of different fuel injection pressure levels, and the learned value storage means updates and stores learned values for the plurality of different fuel injection pressure levels. Thus, the difference between an injection quantity to be injected in the injection command pulse time by the injector and an actual injection quantity can be quantitatively determined in a state where the engine is in operation even at a high fuel injection pressure and at a very small injection quantity, which is difficult to guarantee even by the single injector.

The learned values stored by the learned value storage means for fuel injection pressure levels other than the plurality of different fuel injection pressure levels are determined by interpolation. Thus, the learned values stored by the learned value storage means for the entire working range of fuel injection pressure in an actual vehicle including fuel injection pressures in the learning control mode can be used as corrections to be reflected in calculating the fuel injection quantity for each cylinder. Consequently, an ideal correlation between command injection pulse time and fuel injection quantity can be maintained.

The learned value indicates a deviation of an actual injection quantity from an injection quantity to be injected in the command injection pulse time for each fuel injection pressure and each cylinder of the engine.

It is known that a temporary learned value including a change, caused by load on the engine, of an engine demand injection quantity is abnormally greater than other temporary learned values. Therefore, the injection quantity controller is provided with the temporary learned value storage means capable of dividing the learned control mode injection quantity into substantially equal n injection quantities, of calculating a learned value of, for example, injection quantity by adding up the first injection quantity correction for each cylinder or a value obtained by dividing the first correction by n, and the uniform second injection quantity correction or a value obtained by dividing the second correction by n while the inter-cylinder engine speed variation correction and the mean engine speed correction are being carried out, and of repeating the learning control operation a plurality of times to update and store the learned values calculated by repeating the learning control operation a plurality of times. The minimum value for each fuel injection pressure and each cylinder among the plurality of updated and stored learned values is used as the final learned value to determine whether or not the temporary learned value is normal. Since excessive correction of fuel injection quantity resulting from false learning (false correction) or excessive learning (excessive correction) can be prevented, the increase of combustion noise and vibrations of the engine, and the deterioration of emissions can be avoided. Thus, the minimum temporary learned value among the temporary learned values obtained by the plurality of learning control operations, i.e., a proper temporary learned value, can be reflected as the final learned value (correction) in the fuel injection quantity.

The calculation of learned value for every one of learned values of the plurality of different fuel injection pressure levels and for selecting the minimum value among the plurality of temporary learned valves as the final learned value to improve the learning accuracy (correcting accuracy) corresponding to the deterioration of the performance of the injector due to the deviation of the actual injection quantity from the injection quantity to be injected in the command injection pulse time increases combustion noise due to high-pressure injection. Therefore, it is desirable to calculate the learned value or the temporary learned value at a predetermined learned value calculating frequency or a predetermined correcting frequency. However, when the learned value is calculated at the predetermined learned value calculating frequency or the predetermined correcting frequency, a state in which an injection quantity of fuel different from a proper injection quantity is injected is continued until the next learned value or temporary learned value is calculated and hence the performance of the engine is deteriorated if an unexpected sudden change of injection quantity occurs or when the calculation of a learned value or a temporary learned value is executed without detecting a state in which a load, such as an electrical load, is applied to the engine.

The accuracy of decision of false learning can be improved by providing a command to perform the inter-cylinder engine speed variation correction and the mean engine speed correction again from the beginning when the uniform second injection quantity correction for all the cylinders or the second correction is smaller than a predetermined value under a condition other than the learning executing conditions, and to perform a learning control operation that updates and stores the calculated learned value, a fuel injection quantity corresponding to the desired fuel injection quantity can be determined for a period preceding the calculation of the next learned value or temporary learned value by executing learning again after false learning, and the deterioration of the performance of the engine can be prevented. When a state where a load, such as an electrical load, is applied to the engine can be detected during relearning control, time necessary for calculating the final learned value can be greatly curtailed by using a temporary learned value calculated by a single learning control cycle as the final learned value, as compared with the learning control that uses the minimum value among the plurality of temporary learned values calculated by a plurality of learning control cycles as the final learned value.

A command is provided not to store a learned value obtained by the present learning control cycle and to start the learning control cycle from the beginning or to inhibit or suspend the learning control operation when the difference between a learned value obtained by the preceding learning control cycle and that obtained by the present learning control cycle is outside a predetermined range or when an integrated learned value is greater than a predetermined value. Thus, false learning or excessive learning can be prevented.

A command is provided to inhibit or suspend the learning control operation upon the increase of the uniform second injection quantity correction for all the cylinders or the second correction from the start of the learning control operation by a value greater than a predetermined value. Thus, false learning or excessive learning can be prevented.

It is possible that false correction or excessive correction occurs when a learned value is used due to the effect of fuel injection quantity, fuel injection pressure and engine speed when a learned value is reflected in a region other than that for learning control mode. Excessive correction of fuel injection quantity caused by false correction or excessive correction can be prevented by using a value obtained by tempering the learned value or the temporary learned value with a correction coefficient serving as a measure of the characteristics of a fuel injection system as a learned correction. Thus, the increase of combustion noise and vibrations of the engine and the deterioration of emissions can be prevented, and a proper learned correction can be reflected as a correction in fuel injection quantity.

When an idling injection quantity (learning control mode injection quantity) corresponding to a predetermined operating condition of the engine or to idling fuel consumption includes an increment of engine demand injection quantity due to loading of the engine, false learning occurs and a learned value including the increment of engine demand injection quantity in addition to an amount of scatter of injection quantities and a secular change of injection quantity is calculated. A difference between the injection quantity and the idling fuel consumption can be distinguished and the effect of the change of the engine demand injection quantity can be removed from the amount of scatter of injection quantities and the secular change of injection quantity, when the learned value or the false learned value of the idling injection quantity (learning control mode injection quantity) corresponding to the idling fuel consumption is determined by subtracting a change in the set engine demand injection quantity corresponding to the variation of load on the engine from the sum of the first injection quantity correction or the first correction, and the second injection quantity correction or the second correction or adding the same to the sum of the first injection quantity correction or the first correction, and the second injection quantity correction. Thus, excessive correction of fuel injection quantity resulting from false learning (false correction) or excessive learning (excessive correction) can be prevented. Consequently, the increase of combustion noise and vibrations of the engine, and the deterioration of emissions can be prevented, and a proper learned injection quantity can be reflected as a correction in the fuel injection quantity.

When a learning control operation is performed to divide the learning control mode injection quantity substantially uniformly for n injection cycles, to calculate, for example, a learned injection quantity by adding up a value obtained by dividing the first injection quantity correction or the first correction for each cylinder by n and a value obtained by dividing the uniform second injection quantity correction for all the cylinders or the second correction by n while intercylinder engine speed variation correction and mean engine speed correction are being performed, and to update and store the calculated learned injection quantity, the learning control operation continues indefinitely and the deterioration of the performance (function) of the injector due to the variation of the injection quantity and the secular change of injection quantity cannot be corrected if the learning executing conditions are invalidated by operations, such as depression of the accelerator pedal and closing of the switch of the air conditioner, and learning control operation is suspended frequently.

Time necessary for completing a learning control operation can be curtailed by starting the succeeding learning control operation after the learning conditions have become valid from a learning state where the preceding learning control operation was suspended due to the invalidity of the learning executing conditions. Thus, the learning control operation can be surely completed even if the learning control operation is suspended frequently. Even when a learning control operation for calculating an injection quantity, as a temporary learned value, by adding up a value obtained by dividing the first correction or the first correction for each cylinder by n and a value obtained by dividing the uniform second correction or the second correction for all the cylinders by n, and updating and storing the calculated injection quantity is executed a plurality of times, the calculation of the next temporary learned value can be started without calculating the first temporary learned value by starting the succeeding learning control operation after the learning conditions have become valid from a learning state where the preceding learning control operation was suspended.

The learning executing conditions are valid under a condition where an idling fuel consumption state and false learning is detected or where the frequency of an ignition switch opening operation, the distance traveled by a vehicle, the operating time of the engine or the secular reduction of injection quantity resulting from the deterioration of the performance and function of the injector due to the secular change of injection quantity meets predetermined conditions and is invalid under conditions other than the foregoing condition. Use of input information about the change of load on the engine, such as power for driving engine accessories and electrical loads, the setting of the select lever in the neutral range or the parking range, or a condition where the clutch pedal is depressed by the driver in combination will enable the further effective detection of a state where the engine is operating at an idling fuel consumption.

If an injector has, for example, an injection quantity changing characteristic such that the injection quantity does not change at a fixed time rate, the secular change of injection quantity cannot be corrected by a learned correction if the frequency of calculation of learned value or the frequency of correction is excessively low, and the engine performs abnormal operation, such as generation of large noise due to high injection pressure, when a learned value is calculated if the frequency of calculation of learned value or the frequency of correction is excessively high. The frequency of calculation of learned value or the frequency of correction can be properly determined according to the frequency of an ignition switch opening operation, the distance traveled by a vehicle or the secular reduction of injection quantity by changing the frequency of calculation of learned value or the frequency of correction according to the frequency of an ignition switch opening operation, the distance traveled by a vehicle or the secular reduction of injection quantity.

Reflecting the learned value stored by the learned value storage means is reflected in the calculation of injection quantities, set according to the operating condition of the engine and the fuel injection quantity, respectively for pilot injection, main injection, after injection and post injection. Thus, a proper fuel injection quantity (command injection quantity) can be determined by using a learned value as a correction corresponding to the deterioration of the performance of the injector due to the large amount of scatter of actual injection quantities with respect to the command injection pulse time for the injector even in a state where the engine is in operation at a high injection pressure and at a very small injection quantity in the range of, for example, 1 to 5 $mm^3$/st, which is very difficult to guarantee even by a single injector.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 8 is a diagram illustrating injection patterns for uniform split injection according to the first embodiment of the present invention;

DETAILED DESCRIPTION OF PREFERRED EMBODIMENTS

Preferred embodiments of the present invention will be described with reference to the accompanying drawings.

First Embodiment

Figure 1:
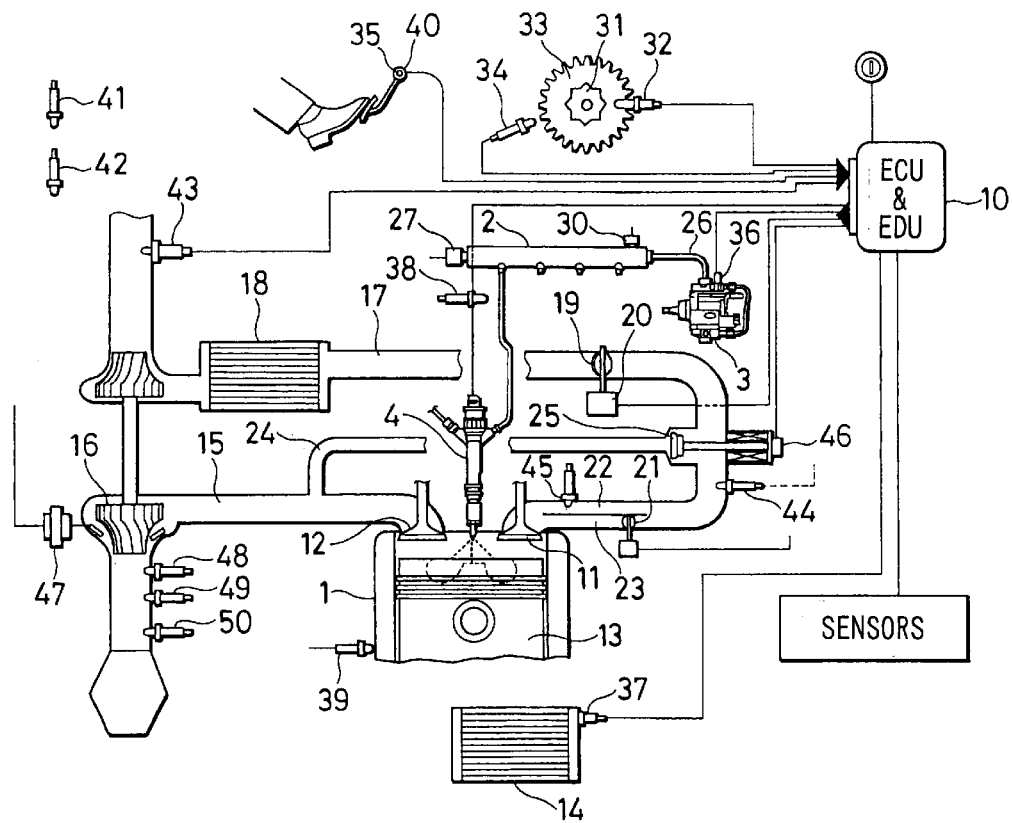
FIG. 1 is a schematic view of a common rail type fuel injection system according to a first embodiment of the present invention.
Figure 2:
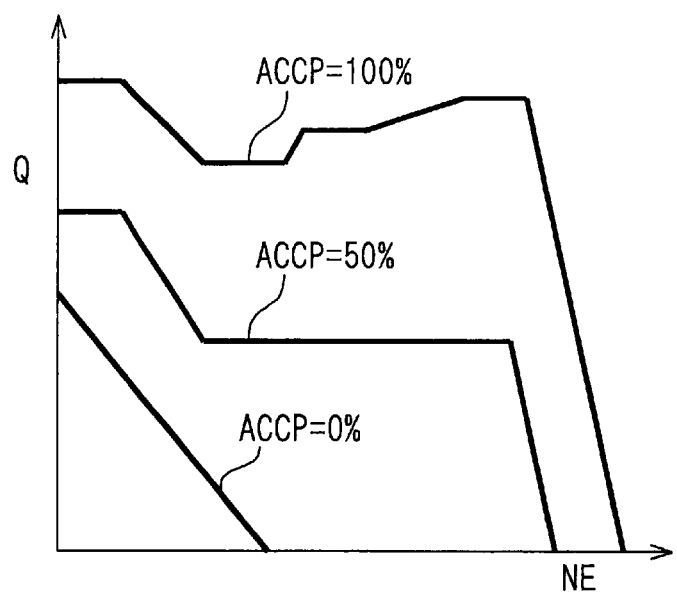
FIG. 2 is a characteristic diagram showing the relation between engine speed and basic injection quantity for acceleration strokes according to the first embodiment of the present invention.
Figure 3:
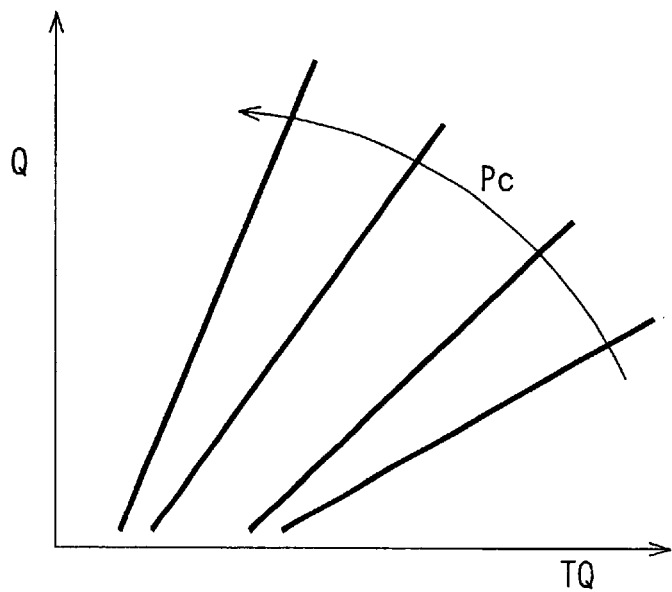
FIG. 3 is a characteristic diagram showing the relation between command injection quantity and command injection pulse time for common rail pressures according to the first embodiment of the present invention.

FIGS. 1 to 16 are views of assistance in explaining a first embodiment according to the present invention. FIG. 1 shows a common-rail type fuel injection system.

The common-rail type fuel injection system in the first embodiment includes a common rail 2, i.e., an accumulator for storing a high-pressure fuel pressurized at a high pressure corresponding to a fuel injection pressure at which the fuel is injected into the cylinders of an internal combustion engine, such as a four-cylinder diesel engine (hereinafter referred to simply as "engine"), a fuel supply pump 3, i.e., a fuel feed pump, for supplying the fuel under pressure into the common rail 2, a plurality of injectors 4 (four injectors in the embodiment) for injecting the high-pressure fuel accumulated in the common rail 2 into the cylinders of the engine 1, and an electronic control unit (hereinafter abbreviated to "ECU") 10 for electronically controlling the fuel supply pump 3 and the plurality of injectors 4.

The engine 1 is a four-stroke cycle four-cylinder engine provided with four cylinders, an oil pan and such. The cylinders of the engine 1 are defined by a cylinder block and a cylinder head. An intake port and an exhaust port formed in the cylinder head and corresponding to the cylinder are closed and opened by an intake valve 11 and an exhaust valve 12, respectively. A piston 13 is fitted for axial sliding motion in each cylinder and is connected to a crankshaft, not shown, by a connecting rod, not shown. A radiator 14 is disposed in an engine room, not shown, at a position where the radiator 14 is exposed to opposed wind. The radiator 14 is provided with a water temperature sensor 37 for measuring the temperature of cooling water for cooling the engine 1.

While the engine 1 is in operation, the exhaust gas discharged from the cylinders flows through an exhaust pipe 15, drives the turbine wheel of a variable-geometry turbocharger (VGT) 16 and is discharged through a muffler, not shown. The VGT 16 is controlled on the basis of signals provided by an intake pressure sensor, a boost pressure sensor 44 and a VGT position sensor 47. Compressed, high-temperature intake air is introduced into the cylinder through the intake port of the engine 1 after being cooled by an intercooler 18.

A throttle valve 19 is placed in an intake pipe 17. The throttle valve 19 adjusts the flow rate of intake air flowing through the intake pipe 17 into the engine 1. The angular position of the throttle valve 19 is adjusted by an actuator 20 controlled by a control signal provided by the ECU 10. The actuator 20 is internally provided with a throttle position sensor, not shown, for measuring the position of the throttle valve 19. The throttle position sensor may be such as capable of reporting a fully closed position of the throttle valve 19 for an idling operation and substantially fully open position of the throttle valve 19 for a high-load operation to the ECU 10.

A swirl control valve (hereinafter, abbreviated to "SCV") that operates in response to a signal provided by the ECU 10 is placed in a part, near the intake port, of the intake pipe 17. The SCV 21 is placed in a bypass passage 23 bypassing an intake passage 22 provided with an intake temperature sensor 45. Power is supplied to an actuator for operating The SCV 21 to open the SCV 21 while the engine 1 operates in a high-load operating mode and supply of power to the actuator is stopped to close the SCV 21 while the engine 1 is operating in a low-load operating mode.

In this embodiment, an exhaust-gas recirculating pipe 24 is connected to the intake pipe 17 to recycle a small part of the exhaust gas flowing through the exhaust pipe 15 to the intake pipe 17 for exhaust-gas recirculation (EGR). A valve for exhaust-gas recirculation (hereinafter referred to as "EGR valve") is placed at the joint of the intake pipe 17 and the exhaust-gas recirculating pipe 24. A part of the exhaust gas flowing trough the exhaust pipe 15 is mixed into the intake air to be sucked in the cylinder to reduce the production of $NO_x$. The position of the EGR valve 25 is regulated so that the exhaust gas is mixed at an exhaust-gas recirculating rate determined according to the operating condition of the engine 1 into the intake air. Exhaust-gas recirculating rate (EGR rate) is controlled at a predetermined value in a feedback control mode on the basis of signals provided by an intake air flow sensor 43, the intake temperature sensor 45, an exhaust $O_2$ sensor 48 and an EGR valve position sensor 46.

The high-pressure fuel pressurized at the fuel injection pressure must be continuously accumulated in the common rail 2. The fuel supply pump pumps the high-pressure fuel through a pressure pipe 26 into the common rail 2 to accumulate the high-pressure fuel in the common rail 2. A pressure limiter 27 is placed in a relief pipe, not shown, connecting the common rail 2 to a fuel tank to prevent the rise of the pressure in the common rail 2 beyond a set limit pressure. The pressure of the fuel accumulated in the common rail 2 corresponding to the fuel injection pressure, which is called also "common rail pressure", is measured by a common rail pressure sensor 30, i.e., an injection pressure detecting means. The common rail pressure sensor 30 is a semiconductor pressure sensor provided with a sensing device, such as a piezoelectric device, mounted on a silicon substrate (circuit substrate), and capable of providing an electric signal (voltage signal) representing a fuel injection pressure.

The fuel supply pump 3 is a high-pressure pump including a feed pump, not shown, for pumping the high-pressure fuel from the fuel tank, not shown, into the common rail 2, and a solenoid valve, such as a suction regulating valve, for regulating the discharge of the feed pump. The fuel supply pump 3 is internally provided with a fuel temperature sensor 36 for measuring the temperature of the fuel sucked up from the fuel tank.

Injectors 4 are attached to the cylinder block of the engine 1 at positions corresponding to the cylinders #1 to #4, respectively. Each of the injectors 4 is an electromagnetic fuel injection valve including an injection nozzle through which the high-pressure fuel is injected into the corresponding cylinder, a solenoid valve including a nozzle needle, and a solenoid, i.e., an actuator, for moving the nozzle needle placed in the fuel injection nozzle in an opening direction, and a spring for urging the nozzle needle in a closing direction.

The injector 4 injects the high-pressure fuel accumulated in the common rail 2 into the corresponding cylinder of the engine 1, for example, while the solenoid valve is open. The fuel leaked from the injector 4 or the fuel discharged from a back pressure control chamber for controlling back pressure applied to the nozzle needle (return fuel) is returned through a fuel return passage t the fuel tank. When valve opening time for which the solenoid valve of the injector 4 is increased, fuel injection quantity, i.e., the quantity of fuel injected into the cylinder, increases accordingly, and vice versa.

The ECU 10 is provided with a microcomputer of a generally known architecture includes a CPU for carrying out control operations and arithmetic operations, a storage device, such as a ROM, a standby RAM, an EEPROM or a RAM, for storing programs and data, an input circuit, an output circuit, a power circuit, an injector driving circuit, a pump driving circuit and such. A voltage signal provided by the common rail pressure sensor 30 and sensor signals provided by other sensors are processed for A/D conversion by an A/D converter, the A/D converter gives digital signals corresponding to the input sensor signals to the microcomputer of the ECU 10. When the engine key is returned to an IG position to close the ignition switch after cranking the engine 1, the actuators for operating the component parts including the fuel supply pump 3 and the injectors 4 are controlled electronically.

A cylinder identifying means included in this embodiment includes a signal rotor 31 mounted on the camshaft of the engine 1, capable of turning once while the crankshaft of the engine 1 turns two times, and provided on its circumference with teeth (projections) respectively corresponding to the cylinders, and an electromagnetic sensor 32, i.e., a cylinder identifying sensor, that generates a pulse G every time one of the teeth moves past the electromagnetic sensor 32.

An engine speed sensor of this embodiment includes a signal rotor 33 mounted on the camshaft of the engine 1, capable of turning once while the crankshaft of the engine 1 turns once, and provided on its circumference with crank angle indicating teeth (projections), and a crank angle sensor (electromagnetic sensor) 34 that generates an NE pulse every time one of the crank angle indicating teeth moves past the electromagnetic sensor 34. The crank angle sensor 34 provides a plurality of NE pulses while the signal rotor 33 turns once, i.e., while the crankshaft turns once. The specific NE pulses corresponds to the top dead centers TDCs of the pistons of the cylinders #1 to #4, respectively. The ECU 10 measures intervals between the NE pulses to measure engine speed NE.

The ECU 10 includes a function of an idling fuel consumption detecting means for detecting a low-load low-speed state, i.e., stable idling state (idling fuel consumption state) when a state where engine speed NE is not higher than a predetermined value of, for example, 1000 rpm, acceleration stroke ACCP is not greater than a predetermined value of, for example, 0%, running speed SPD of the vehicle is not higher than a predetermined value of, for example, 0 km/h, command injection quantity QFIN is equal to a predetermined value of, for example, an idling fuel consumption of 5 mm$^3$/st, and the transmission is set in neutral (N) is detected.

A state where the engine 1 is in a stable idling operation (idling fuel consumption state) can be effectively detected by combination of input information about the detection of a parking brake application signal, detection of change of mechanical load of driving engine accessories including an alternator, a water pump and an oil pump, and electrical load of driving electric devices including head lamps, a car audio system, an air conditioner switch, a heater switch and a fan switch, detection of a selector lever set in a neutral position or a parking position, or detection of depression of the clutch pedal.

The ECU 10 includes a discharge control unit (SCV control unit) that calculates an optimum fuel injection pressure, i.e., an optimum common rail pressure, which is most desirable for the operating condition of the engine 1 and drives the solenoid valve of the fuel supply pump 3 through a pump driving circuit. The ECU 10 calculates a desired fuel injection pressure Pt on the basis of information about the operating condition of the engine 1 including an engine speed NE measured by the crank angle sensor 34, i.e., engine speed sensor, and an acceleration stroke ACCP measured by an acceleration stroke sensor 35, adjusts a pump-driving signal (driving current) for driving the solenoid valve of the fuel supply pump 3 to control the discharge of the fuel supply pump 3 such that the working fuel injection pressure coincides with the desired fuel injection pressure Pt.

More preferably, to improve the accuracy of control of fuel injection quantity, it is desirable to control the pump driving signal for driving the solenoid valve of the fuel supply pump in a feedback control mode so that the fuel injection pressure Pc measured by the common rail pressure sensor 30 coincides with the desired fuel injection pressure Pt determined on the basis of the information on the operating condition of the engine 1. Desirably, the driving current SCV supplied to the solenoid valve is controlled by a duty cycle control method; that is, the accurate digital control of the fuel injection pressure can be achieved by adjusting the duty cycle of the pump driving signal according to the desired fuel injection pressure Pt to adjust the opening of the solenoid valve.

Figure 4:
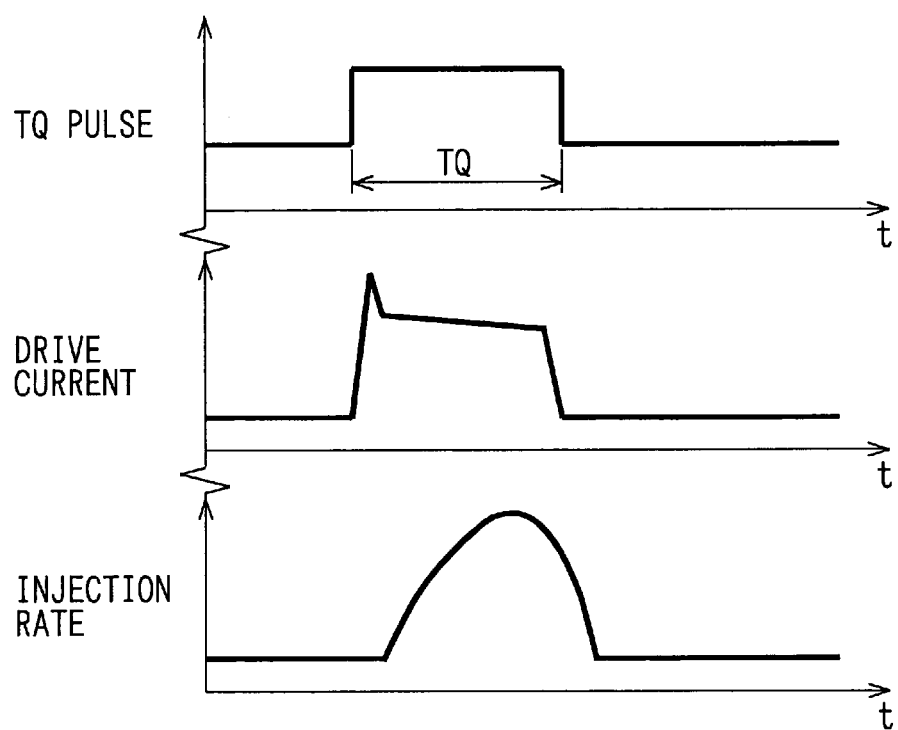
FIG. 4 is a time chart showing TQ pulse, Injector driving current and fuel injection rate according to the first embodiment of the present invention.

The ECU 10 serves also as an injection quantity controller capable of individually controlling fuel injection quantities to be injected into the cylinders by the injectors 4. The ECU 10 includes a basic injection quantity determining device that calculates an optimum basic injection quantity Q by using the engine speed NE measured by the crank angle sensor 34 (engine speed detecting means), the acceleration stroke ACCP measured by the acceleration stroke sensor 35 and a characteristic map (FIG. 2) produced beforehand on the basis of experimental data, a command injection quantity determining device that calculates a command injection quantity QFIN by tempering the basic injection quantity Q with an injection quantity correction determined on the basis of operating conditions including a fuel temperature THF measured by the fuel temperature sensor 36 and a cooling water temperature THW measured by the water temperature sensor 37, an injection duration determining device that calculates an injection command pulse width TQ, i.e., the duration of an injection command pulse, on the basis of the common rail pressure Pc corresponding to the fuel injection pressure, the command injection quantity QFIN and a characteristic map (FIG. 3) produced beforehand on the basis of experimental data, and an injector driving device that applies injector driving pulse currents (injection command pulses or TQ pulses) through the injector driving circuit EDC to the solenoid valves of the injectors 4. FIG. 4 is a time chart showing an injection command pulse signal of an injection command pulse time (command injection quantity TQ) for a specific cylinder, for example the cylinder #1, the waveform of an injector driving current supplied to the solenoid valve of the injector 4 for the cylinder #1 according to the injection command pulse time, and a fuel injection rate.

This embodiment calculates the basic injection quantity Q, the injection time T and the desired fuel injection pressure Pt by using data provided by operating condition detecting devices for detecting the operating conditions of the engine 1, including the crank angle sensor 34, i.e., an engine speed sensor, and the acceleration stroke sensor 35. The basic injection quantity Q, the injection time T and the desired fuel injection pressure Pt may be tempered for correction with the fuel injection pressure Pc measured by the common rail pressure sensor 30 or with detection signals (data on the operating conditions of the engine) provided by other sensors for detecting the operating conditions, such as the fuel temperature sensor 36, the water temperature sensor 37, a leakage fuel temperature sensor 38, an oil temperature sensor 39, an idling acceleration stroke sensor 40, an atmospheric pressure sensor 41, an atmospheric temperature sensor (ambient temperature sensor) 42, an intake air quantity sensor 43, the boost pressure sensor 44, an intake temperature sensor 45, the EGR valve position sensor 46, the VGT position sensor 47, the exhaust $O_2$ sensor 48, an exhaust temperature sensor 49, an exhaust pressure sensor 50, a throttle position sensor, an intake pressure sensor, an injection time sensor and such.

A starting circuit through which a current is supplied to a starter motor when the ignition key is inserted in an ignition switch and turned to a start position ST to close a starting switch is connected to the ECU 10. The ECU 10 receives signals indicating the conditions of the vehicle, such as a speed signal indicating a selected speed of the transmission driven by the engine 1, a signal indicating the depression of the clutch pedal, a signal indicating the supply of a current to the starting motor, a speed signal provided by a vehicle speed sensor, signals indicating electrical loads including electromagnetic cutch included in an air conditioning system, an electric fan for a condenser included in the air conditioning system, a fan for blowing air into the passenger compartment, included in the air conditioning system, an electric fan for the radiator and head lamps, and signals indicating mechanical loads including a compressor included in the air conditioning system and an oil pump included in a power steering system.

In the common rail type fuel injection system in this embodiment, the injector 4 for each cylinder is capable of performing a multiple-injection operation including, for example, a plurality of pilot injection cycles and a main injection cycle at least twice during one combustion stroke of each cylinder of the engine 1 while the crankshaft of the engine 1 rotates two times (through an angle of 720° CA) for one four-stroke cycle including a suction stroke, a compression stroke, an expansion stroke (combustion stroke) and an exhaust stroke.

The ECU 10 is provided with an injection quantity determining device capable of calculating injection quantities for the injection cycles of the multiple-injection operation, i.e., a pilot injection quantity and main injection quantity, on the basis of the operating condition of the engine 1 (information about the operation of the engine) and the basic injection quantity, an interval determining device capable of calculating an interval between a pilot injection cycle and a main injection cycle on the basis of engine speed and pilot injection quantity and an interval between pilot injection cycles on the basis of engine speed and pilot injection quantity, and an injection period determining device capable of calculating a pilot injection period on the basis of pilot injection quantity and fuel injection pressure and a main injection period on the basis of main injection quantity and fuel injection pressure.

The ECU 10 in this embodiment executes an inter-cylinder engine speed variation correcting operation (FCCB). The inter-cylinder engine speed variation correcting operation measures engine speed changes in the expansion strokes of the cylinders of the engine 1 while the engine 1 is in a stable idling state, compares the measured engine speed differences between the cylinders of the engine 1 with the mean engine speed difference of the engine speed differences for all the cylinders, and sets optimum fuel injection quantities individually for the cylinders so as to reduce the inter-cylinder engine speed variations.

More concretely, time intervals between pulses of an NE signal provided by the crank angle sensor 34 are measured and an instantaneous engine speed during the expansion stroke of each cylinder of the engine 1 is calculated, and the maximum one of the time intervals between the pulses of the NE signal in the angular range of BTDC 90° CA and ATDC 90° CA is regarded as the lowest engine speed Nl of the instantaneous engine speed for the cylinder. The minimum one of the time intervals between the pulses of the NE signal in the angular range of BTDC 90° CA and ATDC 90° CA is regarded as the highest engine speed Nh of the instantaneous engine speed for the cylinder. A low engine speed and a high engine speed representing the variation of the engine speed for the cylinder may be used instead of the lowest engine speed Nl and the highest engine speed Nh.

The foregoing calculating operations are performed for all the cylinders and the difference $\Delta Nk$ between the highest engine speed Nh and the lowest engine speed Nl is calculated. Thus, a measured value representing the variation of the engine speed for each cylinder of the engine 1 is calculated. Then, the mean engine speed difference $\Sigma \Delta Nk$ of the engine speed differences $\Delta Nk$ for all the cylinders is calculated; that is, the engine speed differences for all the cylinders of the engine 1 are averaged, the mean engine speed difference is calculated, and the deviations of the engine speed differences for all the cylinders from the mean engine speed difference are calculated. Then, a first correction (FCCB correction) for reducing the inter-cylinder engine speed variation is added to the calculated injection quantities respectively for the cylinders (first correction calculating means).

The ECU 10 in this embodiment carries out a mean engine speed correcting operation (ISC) to adjust the mean idling speed of idling speeds at which the engine is operating for idling to a desired idling speed. The mean engine speed correcting operation is performed for all the cylinders to reduce the deviation $\Delta Ne$ of the mean engine speed from the desired engine speed. More concretely, the actual engine speed NE is compared with the desired engine speed ISC-desired NE, and a second injection quantity correction is calculated according to the difference between the actual engine speed Ne and the desired engine speed ISC-desired NE. Then, the second correction (ISC correction) necessary for adjusting the actual engine speed to the desired engine speed is added to all the corrected injection quantities corrected by using the first corrections calculated for all the cylinders to make the mean engine speed coincides substantially with the desired engine speed (second correction calculating means).

The ECU 10 in this embodiment executes an ordinary idling speed control operation (ISC) while the engine 1 is in idling operation after the completion of a pilot injection quantity learning control operation, which will be described later, to avoid exposing the driver to unpleasant engine vibrations resulting from the drop of idling speed, to avoid engine stall or to avoid increasing engine noise and increasing fuel consumption due to increase in idling speed. The idling speed control operation controls the injection quantity at an injection quantity necessary for maintaining the desired idling speed (ISC-desired NE) regardless of the variation of load torque acting on the engine 1. It is desirable to control the fuel injection quantity in a feedback control mode so that the actual engine speed coincides substantially with the desired engine speed.

Figure 5:
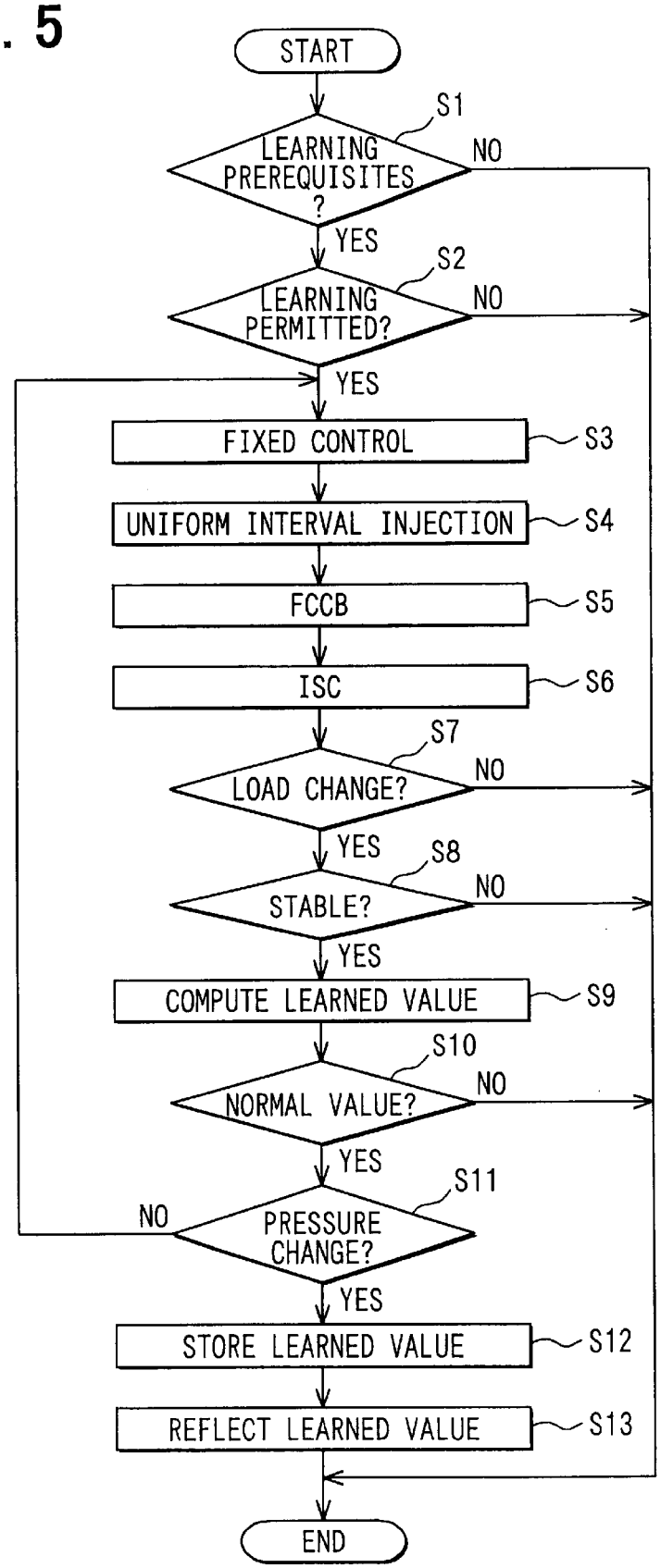
FIG. 5 is a flowchart of a learning control method of controlling pilot injection quantity according to the first embodiment of the present invention.

A method of learning control of pilot injection quantity in this embodiment will be briefly described with reference to FIGS. 1 to 16. FIG. 5 is a flowchart of the method of learning control of pilot injection quantity. A control routine shown in FIG. 5 is repeated at predetermined time intervals after the ignition switch has been closed.

At time to start the control routine shown in FIG. 5, a query is made to see if learning prerequisites are valid in step S1. The control routine is ended if the response to the query in step S1 is negative.

(1) Signals provided by the sensors and switches connected to the engine 1 or attached to the vehicle and capable of detecting operating conditions of the engine 1 are examined to see if the engine 1 is in a stable idling operation. If the engine 1 is not in a stable idling operation, the control routine shown in FIG. 5 is ended. The sensors and switches capable of detecting operating conditions of the engine 1 include the gear position sensor, the clutch sensor, the starter sensor, the common rail pressure sensor 30, the crank angle sensor 34, the acceleration stroke sensor 35, the idling acceleration stroke sensor 40, the EGR position sensor 46, the VGT position sensor 47, the exhaust pressure sensor 49 and the throttle position sensor.

(2) Signals provided by sensors connected to the engine 1 or attached to the vehicle and capable of detecting environmental conditions are examined to see if the signals are in ranges determined beforehand to make idling fuel consumption coincide with an expected value. The sensors capable of detecting environmental conditions include the fuel temperature sensor 36, the water temperature sensor 37, the leakage fuel temperature sensor 38, the oil temperature sensor 39, the idling acceleration stroke sensor 40, the atmospheric pressure sensor 41, the atmospheric temperature sensor (ambient temperature sensor) 42, the intake air quantity sensor 43, the boost pressure sensor 44, the intake temperature sensor 45, the exhaust $O_2$ sensor 48, the exhaust temperature sensor 49, the exhaust pressure sensor 50, and the throttle position sensor.

(3) Signals provided by the sensors and switches connected to the engine 1 or attached to the vehicle and capable of the loaded state of the engine 1 are examined to see if the load on the engine 1 is in a predetermined range. Those sensors and switches include switches sensors capable of detecting the electric loads of the electric fan for the radiator, an electric heater, the head lamps and the electromagnetic brakes, switches and sensors capable of detecting loads of the air conditioning system, the compressor included in the power steering system and the pumps, and changes in ISC injection quantity necessary for maintaining a change in idling speed or idling speed at a predetermined value.

(4) Lastly, it is confirmed that a command injection quantity, a FCCB correction, an ISC correction, a fuel injection pressure and a command injection time indicating that the idling speed is stable are in the predetermined ranges.

It is decided that the learning requisites are valid (ON) when conditions stated in (1) to (4) are satisfied and conditions are not execution inhibiting conditions.

Figure 6:
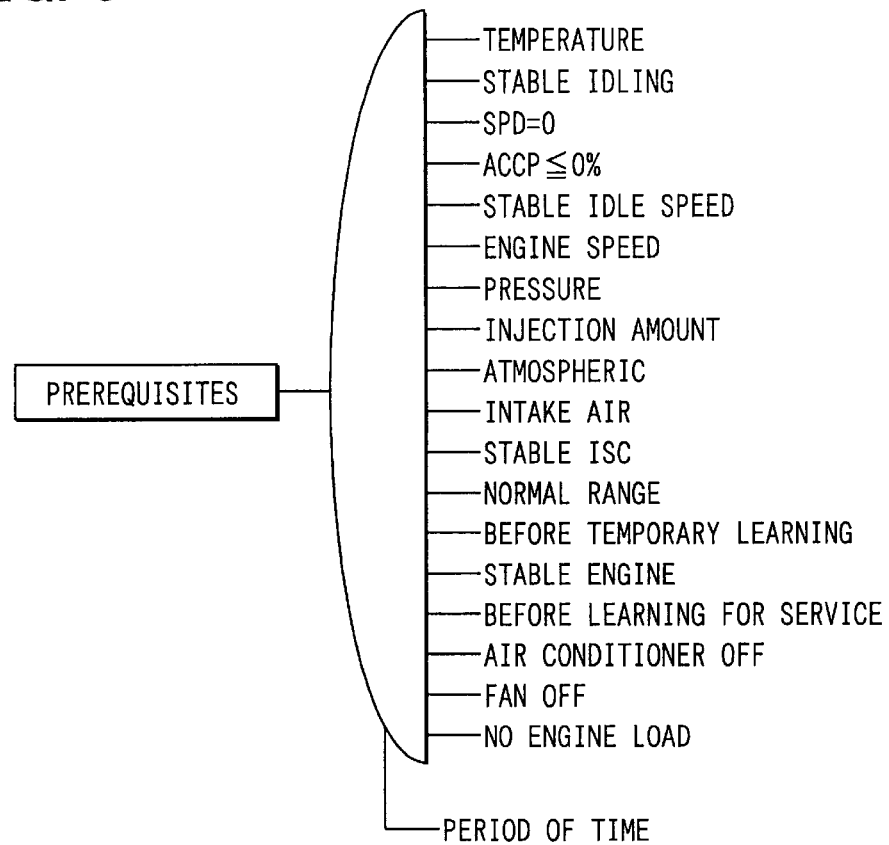
FIG. 6 is a block diagram of conditions for making learning prerequisites valid, ON, according to the first embodiment of the present invention.

For example, as shown in FIG. 6, the learning prerequisites are valid (ON) when all the conditions shown in FIG. 6 are valid; that is, the learning prerequisites are valid (ON) when the learning temperature condition is valid (for example, when the temperature of the engine cooling water is in the range of 60° C. to 90° C.), idling stability is valid (for example, the transmission is set to neutral), running speed condition is valid (for example, when SPD is 0 km/h or below), the acceleration stroke is zero (for example, when ACCP is 0% or below), the idling speed is stabilized (for example, when NE is 1000 rpm or below), the engine speed is valid (for example, when NE is 1000 rpm or below), the fuel injection pressure condition is valid (for example, when Pc is 100 MPa or below), command injection quantity condition is valid (for example, when QFIN is 5 mm$^3$/st, which is not greater than idling fuel consumption), atmospheric pressure condition is valid (for example, atmospheric pressures at high altitudes are invalid), intake air quantity learning conditions are invalid, ISC correction is stable (hunting ISC correction is invalid), learned values in the normal range are valid, a state before the completion of temporary learning is valid, the engine is stable (valid when load on the engine is not varying and engine speed is stabilized), a state before the normal end of learning for service tools, air conditioner switch is off, electric loads including the head lamps (no load on the engine), and all the conditions for continuous time passage are valid. The learning requisites are invalid (OFF) in conditions other than those shown in FIG. 6.

If the response to the query in step S1 is affirmative, i.e., when the learning prerequisites are valid (ON), a query is made in step S2 to see if learning executing conditions are valid. The control routine shown in FIG. 5 is ended if the response to the query in step S2 is negative.

Figure 7:
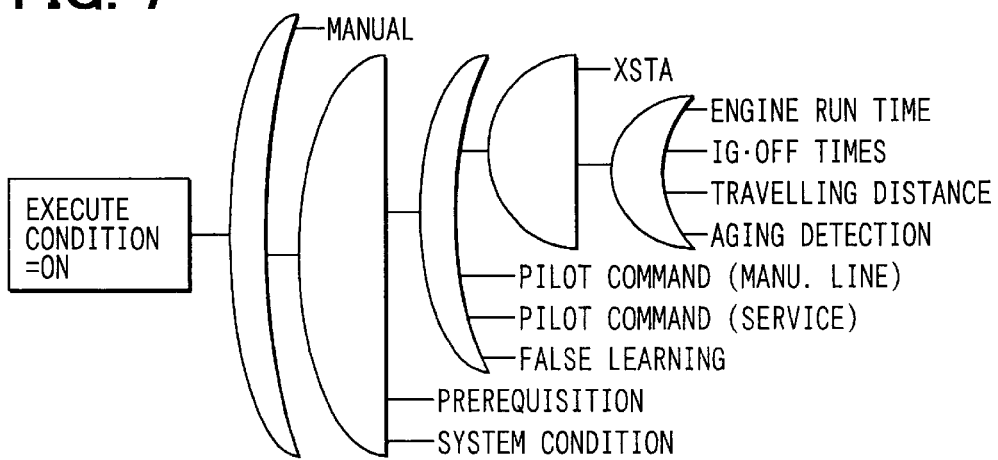
FIG. 7 is a block diagram of conditions for making the learning executing conditions valid, ON, according to the first embodiment of the present invention.

For example, as shown in FIG. 7, the operating time of the engine 1, the frequency of the ignition switch opening operation (IG·OFF), the distance traveled by the vehicle and the operating time of the engine are detected or calculated, or the detected or calculated values are weighted by loads (fuel injection pressure, engine speed, injection quantity, frequency of injection and such), and the learning executing conditions are valid (ON) when those values are greater than predetermined values. It is also possible to make the learning executing conditions valid (ON) when the response to the query in step S1 is affirmative, and the first injection quantity correction (FCCB correction) and the second injection quantity correction (ISC correction), or the engine speed change and the engine speed variation exceed predetermined values. It is also possible to make the learning executing conditions valid forcibly by an external signal.

The learning executing conditions may be made valid when an operation is performed to see if the secular deterioration of the performance (function) of the injector 4 due to the secular change of injection quantity is greater than a predetermined value, in a state where a predetermined time has passed after a starter activation flag (XSTA) has been changed from the ON state to the OFF state (a state a predetermined time after the start of the engine), when pilot learning for the line or pilot learning for market service is requested or when false learning is decided, when the learning executing prerequisites are valid and the common rail type fuel injection system is in the normal operation, or when manual learning executing conditions are valid. The learning executing conditions are invalid (OFF) under conditions other than those shown in FIG. 7.

If the response to the query in step S2 is affirmative, i.e., if the learning executing conditions are valid (ON), the frequency of injection in one expansion stroke for each cylinder is set at n (in this embodiment, a pilot injection quantity is 1 mm$^3$/st when a total injection quantity for idling is 5 mm$^3$/st and the frequency of injection is five), and control command values including a stable desired idling speed of the engine 1, a desired boost pressure, an opening of the SCV 21, an opening of the throttle valve 19, a desired EGR value, a fuel injection pressure (Pfin), and times of n injection cycles (or intervals between pilot injection cycles) are fixed as shown in FIG. 8 in step S3 (uniform split injection executing means).

Figures 9, 10, 11:
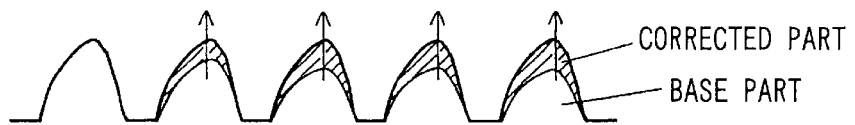
FIG. 9 is a diagram illustrating a pilot injection quantity learning correcting method according to the first embodiment of the present invention.
FIG. 10 is a diagram modeling injection behaviors and contents of control according to the first embodiment of the present invention.
FIG. 11 is a diagram modeling injection behaviors and contents of control according to the first embodiment of the present invention.

Then, a command injection quantity for uniform distribution of n injection cycles is calculated. As shown in FIG. 9 and expressed by Expression (1), the command injection quantity (learning control mode injection quantity) is equal to 1/n of idling fuel consumption Qidle obtained by adding corrections for cooling water temperature and fuel temperature to a basic injection quantity obtained from a characteristic map (FIG. 2) showing the relation between engine speed (NE) and measured acceleration stroke ACCP or calculated by using a formula, and used for injection quantity control during ordinary idling operation (injection quantity determining means). In step S4, each command injection quantity: QPL1=QPL2=QPL3=Qmain=Qfup=total−Q/n is corrected taking into consideration the influence of intervals between injection cycles, the influence of pressure in the cylinder dependent on injection timing and the influence of fuel injection pressure so that the equal injection quantities of fuel is injected in the n injection cycles, respectively (uniform split injection quantity correcting means).

$$\text{Pilot injection quantity}=\text{Qidle}/n+\text{QPLCPQ}+\text{QINT}+(\text{Preceding learned value})\times\text{Correction} \qquad \text{Expression (1)}$$

In Expression (1), Qidle is a value retrieved from a characteristic map showing the relation between engine speed NE and basic injection quantity for acceleration strokes ACCP determined through experiments or is calculated by using a formula, QPLCPQ is a cylinder pressure correcting coefficient and QINT is an interval-dependence correcting coefficient. QPLCPQ AND QINT may be corrections for TQ pulse instead of corrections for injection quantity.

Referring to FIG. 11, inter-cylinder engine speed variation correction (inter-cylinder engine speed variation fuel injection correction, inter-cylinder engine speed variation correction, which will be referred to as "FCCB correction") for adjusting fuel injection quantities for the cylinders of the engine 1 is executed according to the inter-cylinder engine speed variation difference ΔNE or ΔT in step S5 to add the first injection quantity correction (FCCB correction ΔQc) to the command injection quantities equal to 1/n of the idling fuel consumption for the cylinders in order that the inter-cylinder engine speed variation is smoothed (uniform split injection quantity correcting means, first correction calculating means). The FCCB correction for each cylinder is divided into n equal split correction ΔQc/n, and the split correction ΔQc is reflected in the command injection quantity (total Q)/n=Qidle/n, i.e., 1/n of the idling fuel consumption.

As shown in FIG. 11, in step S6, uniform mean engine speed correction (hereinafter, referred to as "ISC correction") is executed for all the cylinders to adjust the mean engine speed in each cylinder to the desired engine speed, and a uniform second injection quantity correction (ISC correction QISC) for adjusting the engine speed to the desired engine speed is added to the FCCB correction (ΔQc/n) for each cylinder (uniform split injection quantity correcting means, second correction calculating means). The ISC correction QISC is divided into equal n split corrections QISC/n, and the split correction QISC/n is reflected in the sum of the command injection quantity Qidle/n equal to 1/n of the idling fuel consumption and the FCCB correction ΔQc/n for each cylinder for each injection cycle. The ISC correcting operation is continued, for example, to inject 1 mm³/st uniformly into all the cylinders at time intervals in the range of 50 to 70 ms for a predetermined time or until the ISC correction QISC is stabilized, i.e., until the mean engine speed coincides substantially with the desired engine speed.

Figure 12:
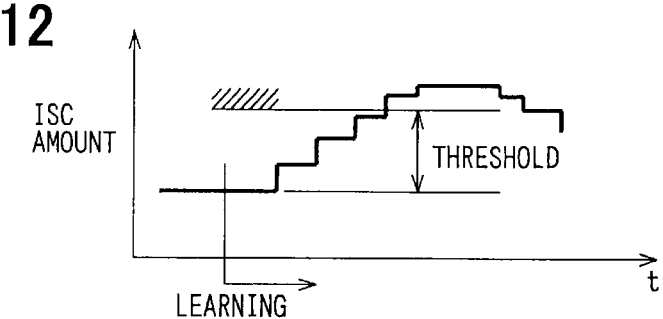
FIG. 12 is a time chart representing the variation of ISC correction with engine load according to the first embodiment of the present invention.

Referring to FIG. 12, in step S7, signals provided by the sensors and switches capable of detecting the variation of loads including the air conditioning system and the power steering system on the engine and the addition of the ISC corrections are examined to see if engine load variation during learning control operation is greater than a predetermined load variation threshold. If it is decided in step S7 that the engine load variation is greater than the load variation threshold, the learning control of pilot injection quantity is suspended to avoid false learning and the control routine shown in FIG. 5 is ended.

Figure 13:
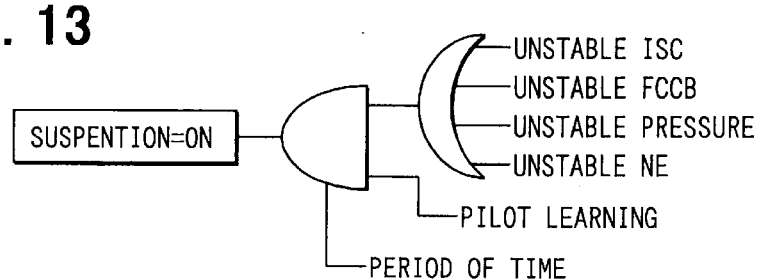
FIG. 13 is a block diagram of conditions for making learning suspending conditions valid, ON, according to the first embodiment of the present invention.

If it is decided in step S7 that the engine load variation is smaller than the load variation threshold, a query is made in step S8 to see if the engine 1 is in stable operation. As shown in FIG. 13, queries are made in step S8 to see if the pilot learning is in process and to see if the change of the ISC correction, the change of the FCCB correction, the change of the fuel injection pressure or the change of the engine speed of the engine 1 is below a predetermined value. If the response to the query in step S8 is negative, i.e., if the engine 1 is not in stable operation, the learning control of pilot injection quantity is suspended and the control routine shown in FIG. 5 is ended.

Figure 14:
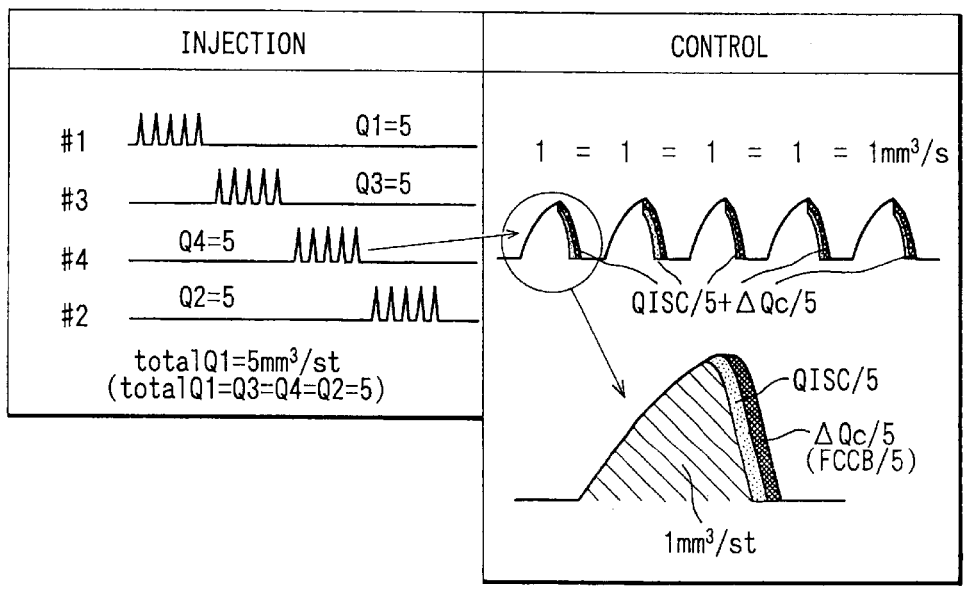
FIG. 14 is a diagram modeling injection behaviors and contents of control according to the first embodiment of the present invention.

If the response to the query in step S8 is affirmative, i.e., if the engine 1 is in stable operation, the present learned value is calculated in step S9 as shown in FIG. 14. The present learned value is calculated by using Expression (2) and the FCCB correction ΔQc/n obtained in step 5 and the ISC correction QISC/n obtained in step S6.

(Present learned value)=ΔQc/n+QISC/n+(Preceding learned value)          Expression (2)

The present learned value is calculated as an injection quantity correction to be added to the command injection quantity (total-Q)/n of the (idling fuel consumption)/n for each injection cycle.

Figures 15, 16:
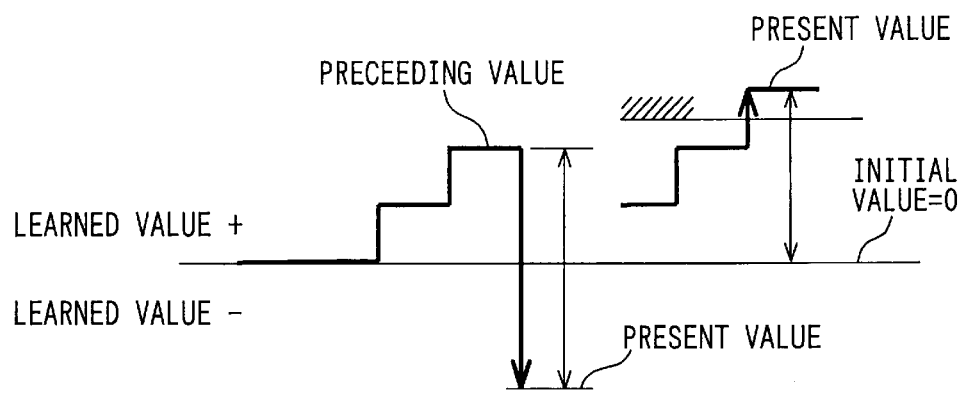
FIG. 15 is a diagram of assistance in explaining learning value guards according to the first embodiment of the present invention.
FIG. 16 is a map storing learned values at a plurality of different injection pressure levels for cylinders according to the first embodiment of the present invention.

Then, the level of the present learned value calculated in step S9 is examined (learned value guard decision) to manage the level of the present learned value. As shown in FIG. 15, in step S10, a query is made to see if the total learned quantity from the initial learned value to the present learned value is greater than a predetermined value and to see if the difference between the preceding learned value and the present learned value (a quantity changeable in one learning control cycle) is in the normal learned value range. If the response to the query in step S10 is negative, i.e., if it is decided that the present learned value is an abnormal value, the learning is invalidated and the control routine shown in FIG. 5 is ended.

After the learning at a fuel injection pressure on one level is completed, the fuel injection pressure is changed for another set pressure in step S11, and step S3 and the flowing steps are repeated. The set pressure level is optional. Then, after the completion of learning at the set pressure level, learned values are written to a map shown in FIG. 16 and are stored in a back-up storage device in step S12 (learned value storage means). The stored learned values are used as injection quantity corrections for calculating a pilot injection quantity using Expression (3). Values for fuel injection pressures other than those used for learning control are determined by interpolation to enable the reflection of the injection quantity corrections in the entire operating range of the engine 1 in step S13.

$$(\text{Pilot injection quantity}) = \qquad\qquad \text{Expression (3)}$$
$$(QPLB + QISC \times KISC) \times QUKTF +$$
$$QFCCB \times KFCCB + (\text{Learned Value}) \times$$
$$QKPC \times QKNE + QPLCPQ + QINT$$

In Expression (3), QPLB is a value retrieved from a characteristic map showing the relation between engine speed NE and basic injection quantity for acceleration stroke ACCP, determined through experiments, QISC is ISC correction, KISC is ISC correction reflecting coefficient, QKTHF is fuel temperature correcting coefficient, QFCCB is FCCB correction, KFCCB is FCCB correction reflecting coefficient, QKPC is learned value pressure sensitivity correcting coefficient, QKNE is learned value engine speed sensitivity correcting coefficient, QPLCPQ is cylinder pressure correcting coefficient and QINT is interval dependence correcting coefficient. The learned value is calculated using a map shown in FIG. 16 stored in a memory. Fuel injection pressures other than those used for learning control are calculated by interpolation. QPLCPQ AND QINT may be TQ pulse corrections instead of fuel injection quantity corrections.

It is known that the idling fuel injection quantity (idling fuel consumption) for idling operation (low-load low speed range) can be kept substantially constant by stabilizing environmental conditions including engine speed, intake and exhaust (EGR, boost pressure). Therefore, the mean engine speed can be stabilized at the desired engine speed and, if the amount of scatter of inter-cylinder engine speed variations is in a predetermined range, the injection quantity for each cylinder coincides substantially accurately with the idling fuel consumption when known ISC correction and FCCB correction are carried out in such a state during idling operation (low-load low-speed range). In such a state, a command injection quantity for accurately injecting an injection quantity equal to (idling control mode injection quantity)/n=(idling fuel consumption)/n can be determined by accurately performing uniform split injection for injecting an injection quantity equal to 1/n of an injection quantity for one injection cycle and executing ISC correction and FCCB correction.

For example, when (Idling control mode injection quantity)=(Idling fuel consumption)=5 mm$^3$/st and the frequency of split injection cycles is five, an injection quantity for each of the split injection cycles is 5/5 mm$^3$/st=1 mm$^3$/st when (Idling control mode injection quantity)=(Idling fuel consumption)=6 mm$^3$/st and the frequency of split injection cycles is six, an injection quantity for each of the split injection cycles is 6/6 mm$^3$/st=1 mm$^3$/st or when the frequency of split injection cycles is two, an injection quantity for each of the split injection cycles is 6/2 mm$^3$/st=3 mm$^3$/st. Thus, a command injection quantity (=deviation of TQ pulse) for the accurate injection of an injection quantity equal to (Idling fuel consumption)/n can be determined. Thus, a state where the engine operates at a high injection pressure and a small injection quantity, such as 1 mm$^3$/st, which is difficult to guarantee even by the single injector, can be accurately corrected.

As apparent from the foregoing description, whereas the conventional method corrects only fuel injection pressure during idling operation, the common rail type fuel injection system in the first embodiment changes the fuel injection pressure for an idling operation (low-load low-speed range) into a plurality of different fuel injection pressure levels, calculates the deviation of an actual injection quantity relative to a command injection pulse time (TQ pulse time) for the injector 4 at the plurality of different fuel injection pressure levels, and an injection quantity correction corresponding to the secular change of injection quantity through FCCB correction and ISC correction while the learning control mode injection quantity corresponding to the idling fuel consumption is being divided into n equal split injection quantities and the n equal split injection quantities are injected by n split injection cycles.

More concretely, as mentioned above in connection with Expression (2), the FCCB correction ΔQc/n for each injection cycle and ISC correction QISC/n for each injection cycle are added up to obtain the learned value for each cylinder. As mentioned above, this learned value is an injection correction for each cylinder to be added to the command injection quantity (total−Q)/n of the (Idling fuel consumption)/n for each injection cycle. The injection quantity correction for each cylinder is updated and stored in a memory as a learned value.

Fuel injection pressures other than those on the plurality of different fuel injection pressure levels are calculated by interpolation. Thus, the learned values stored in the memory can be reflected as injection quantity corrections in calculating pilot injection quantities in the entire working range of fuel injection pressures on the vehicle including fuel injection pressure levels other than the learning control mode fuel injection pressures. Consequently, ideal relation ship can be always maintained between command injection pulse time and pilot injection quantity.

If the total learned quantity determined by the foregoing learning correction is not smaller than a predetermined value or the difference between the preceding learned value and the present learned value is outside a predetermined range, an amount, not smaller than a predetermined value, of scatter of injection quantities with respect to the TQ pulse time can be detected, and hence the malfunction of each injector can be detected. Thus, even in a state where the engine 1 is operating at a high injection pressure and at a small command injection quantity (pilot injection quantity), which is difficult to guarantee even by the single injector, the deviation of the actual injection quantity for the injector 4 with respect to the command injection pulse time (TQ pulse time) and the secular change of injection quantity of the injector 4 can be quantitatively determined and accurate injection quantity correction can be achieved. Since the command injection pulse time (TQ pulse time) for the injector 4 and the learned value are calculated at a fuel injection pressure (common rail pressure) different from that in the learning control mode and at an injection quantity by using the calculated learned value as a learned value of injection quantity for the command injection quantity (pilot injection quantity), a fuel injection pressure can be read immediately before fuel injection and highly sensitive correction of fuel injection pressure and injection quantity can be automatically achieved.

Second Embodiment

Figure 17:
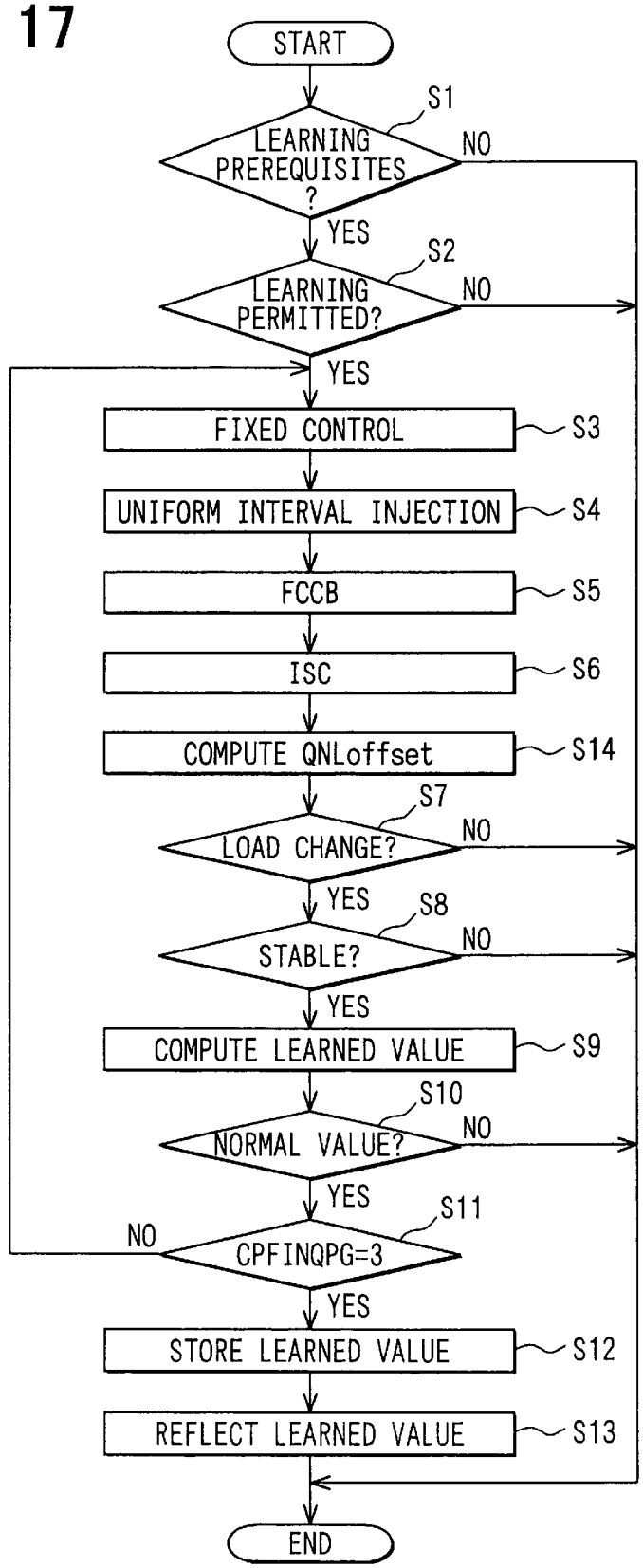
FIG. 17 is a flowchart of a pilot injection quantity learning control method according to a second embodiment of the present invention.

FIG. 17 is a flowchart of a pilot injection quantity learning control method in a second embodiment according to the present invention, in which steps like or corresponding to those of the control routine shown in FIG. 5 are indicated by the same symbols and the description thereof will be omitted.

As mentioned above in connection with the first embodiment, in performing injection quantity correction according to an amount of scatter of actual injection quantities with respect to the TQ pulse time or the secular change of injection quantity (secular functional deterioration of the injector), using the ISC correction and the FCCB correction, the sum of the ISC correction and the FCCB correction is divided in proportion to the total injection quantity (idling injection quantity=idling fuel consumption, which usually is 5 mm$^3$/st) to calculate a learned value. Therefore, if electric load, such as the air conditioning system, or mechanical load, such as the power steering system, on the engine changes during the learning control operation, false learning is performed and a learned value including an injection quantity requirement for idling operation (idling injection quantity) and an increment of an injection quantity demanded by the engine due to the change of the load on the engine (=QISC/n+ΔQc/n+(Preceding learned value)) is calculated.

This embodiment takes into consideration the fact that the change of the engine-demanded injection quantity due to the change of the load on the engine is included in the ISC correction and the FCCB correction, and is able to remove the influence of the change of the engine-demanded injection quantity from a learned value as an injection quantity correction corresponding to the amount of scatter of actual injection quantities and the secular change of injection quantity (secular functional deterioration of the injector) by providing an engine-demanded injection quantity change offset variable according to signals provided by switches and sensors, adding the change of engine-demanded injection quantity to or subtracting the same from the sum of the ISC correction and the FCCB correction.

More concretely, referring to FIG. 17 showing a control routine, after executing FCCB correction in step S5 and ISC correction in step S6, an engine-demanded injection quantity correction QNLoffset for offsetting the effect of the change of combustion in the engine or the variation of load on the engine, such as the variation of the operating condition of the air conditioning system or the power steering system, is calculated in step S14, and then the control routine goes to step S7.

A method of calculating an engine-demanded injection quantity correction will be described. Suppose that an engine 1 needs an idling injection quantity=idling fuel consumption Qidle=A mm³/st for stable idling operation, and the idling injection quantity is divided into K equal split injection quantities for K injection operations. If injection quantities injected by an injector 4 in a TQ pulse time do not scatter, and the function of the injector 4 does not deteriorate with time, an actual injection quantity is A mm³/st when a command injection quantity is A mm³/st.

$$a1+a2+ \ldots +aK=A \quad \text{Expression (4)}$$

where a1, a2, . . . and aK are split command injection quantities for K injection operations, respectively, and A is command injection quantity equal to engine-demanded idling injection quantity=total injection quantity total–Q.

Suppose that injection quantities injected in a command injection pulse time TQ by the injector 4 for, for example, the cylinder #1 is reduced by a decrement Q1. Then, when a command injection quantity A is given, an actual injection quantity is A–Q1. Suppose that load, such as air conditioning system or the power steering system, on the engine 1 corresponds to an injection quantity Q2.

$$a1+a2+ \ldots +aK=(\text{Actual injection quantity } A)-(Q1 \times K)+Q2 \quad \text{Expression (5)}$$

Result of execution of the mean engine speed correction (ISC correction) and the inter-cylinder engine speed variation injection quantity correction (FCCB correction) is represented by Expression (6)

$$a1+a22+ \ldots +aK+(QISC+QFCCB)=(\text{actual injection quantity } A)+Q2 \quad \text{Expression (6)}$$

$$(QISC+QFCCB)=Q1 \times K+Q2 \quad \text{Expression (7)}$$

When a requisite injection quantity correction QNLoffset necessary for compensating for the change of load on the engine is set, a learned correction to be determined by correction learning is obtained by dividing a quantity expressed by Expression (8) by K.

$$QISC+QFCCB+QNL\text{offset}=Q1 \times K+Q2 \quad \text{Expression (8)}$$

The engine-demanded injection quantity correction QNLoffset for correcting the variation of injection quantity due to the variation of the load on the engine is a variable constant and is calculated on the basis of signals provided by switches and sensors attached to a vehicle provided with the engine and an engine load detecting logic. In this case, QNLoffset is approximately equal to Q2.

$$QISC+QFCCB+QNL\text{offset}=Q1 \times K+Q2 \text{ where, } QNL\text{offset} \approx Q2 \quad \text{Expression (9)}$$

$$Q1=(QISC+QFCCB)/K \quad \text{Expression (10)}$$

Thus, an injection quantity Q1 correctly corresponding to the change of the actual injection quantity in the TQ pulse time and the secular change of injection quantity can be calculated.

Third Embodiment

Figure 18:
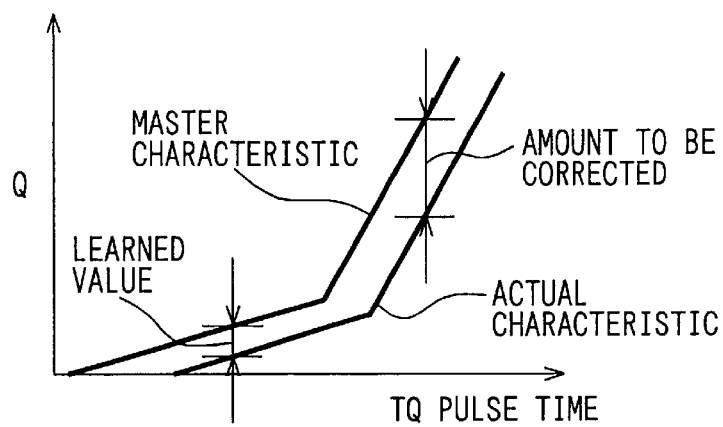
FIG. 18 is a characteristic diagram representing the relation between command injection quantity and TQ pulse time according to a third embodiment of the present invention.
Figure 19:
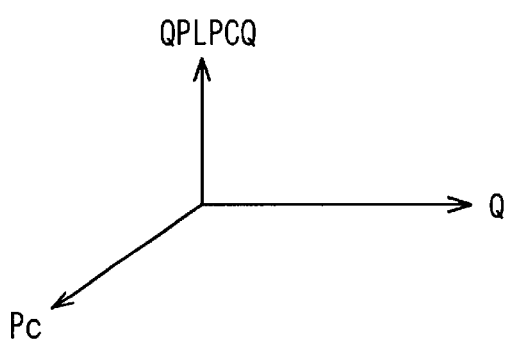
FIG. 19 is a characteristic diagram representing the relation between fuel injection pressure, command fuel injection quantity and correction coefficient according to the third embodiment of the present invention.
Figure 20:
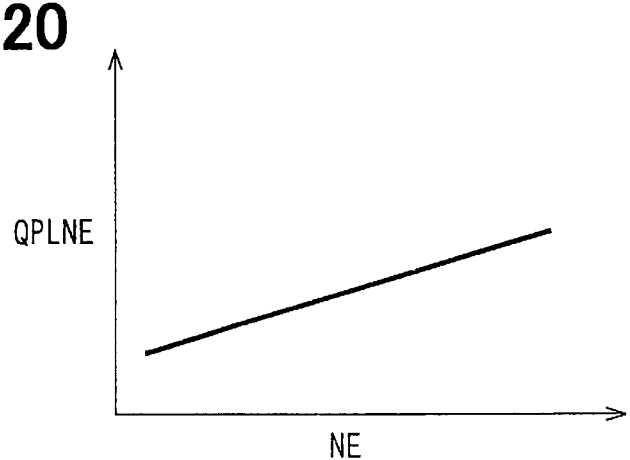
FIG. 20 is a characteristic diagram representing the relation between engine speed and correction coefficient according to the third embodiment of the present invention.

FIGS. 18 to 20 show a third embodiment according to the present invention. FIG. 18 is a graph showing the relation between command injection quantity Q and command injection pulse time (TQ pulse time) for an injector.

When a correction coefficient for preventing the false correction of a learned value is taken into consideration, a TQ-Q characteristic is represented by a curve shown in FIG. 18 when a correction coefficient QPLPCQ relating to the TQ-Q characteristic and a correction coefficient QPLNE relating to engine speed are set. It is known from FIG. 18, if learning is performed in a region where inclination is moderate, that a learned value needs correction due to difference in characteristic when an injection quantity larger than that in a learning control mode is used. A correction coefficient QPLPCQ is retrieved from a two-dimensional map of fuel injection pressure Pc and command injection quantity Q as shown in FIG. 19 to take into consideration the deviation of TQ-Q characteristic.

The correction coefficient can be determined by using a three-dimensional map including temperature condition. Generally, a common rail type fuel injection system does not give consideration to the dependence of injection quantity control on engine speed. However, injection quantity control is slightly dependent on engine speed. Therefore, as mentioned above, a correction coefficient QPLNE is retrieved from a one-dimensional map shown in FIG. 20 showing the relation between correction coefficient QPLNE and engine speed NE for correction relating to engine speed dependence. A learned correction for one injection cycle is calculated on the basis of the correction coefficient QPLPCQ and the correction coefficient QPLNE by using Expression (11).

$$(\text{Learned correction})=QPLPCQ \times QPLNE \quad \text{Expression (11)}$$

Thus, correct learned correction can be calculated for each region, taking into consideration the TQ-Q characteristic of the injection system and the engine speed dependence.

Thus, when the deviation of an actual injection quantity with respect to a TQ pulse time and a quantity of secular change of injection quantity (secular functional deterioration of the injector) are corrected by mean engine speed correction (ISC correction) and inter-cylinder engine speed variation correction (FCCB correction), a learned value is calculated by dividing the sum of an ISC correction and an FCCB correction in proportion to a total injection quantity including a pilot injection quantity and a main injection quantity.

In reflecting a learned value in a region other than that for a learning control mode, it is possible that false correction or excessive correction occurs due to the influence of injection quantity, fuel injection pressure and engine speed if the learned value is used as it stands. Increase in combustion noise, enhancement of engine vibrations and deterioration of emissions due to excessive correction caused by false correction can be avoided by using a corrected learned value obtained by modifying the calculated learned value by using the correction coefficient serving as a measure of the characteristic of an injection system (TQ-Q) and engine speed dependence. Thus, a proper learned value can be reflected in the calculation of the pilot injection quantity.

Fourth Embodiment

Figure 21:
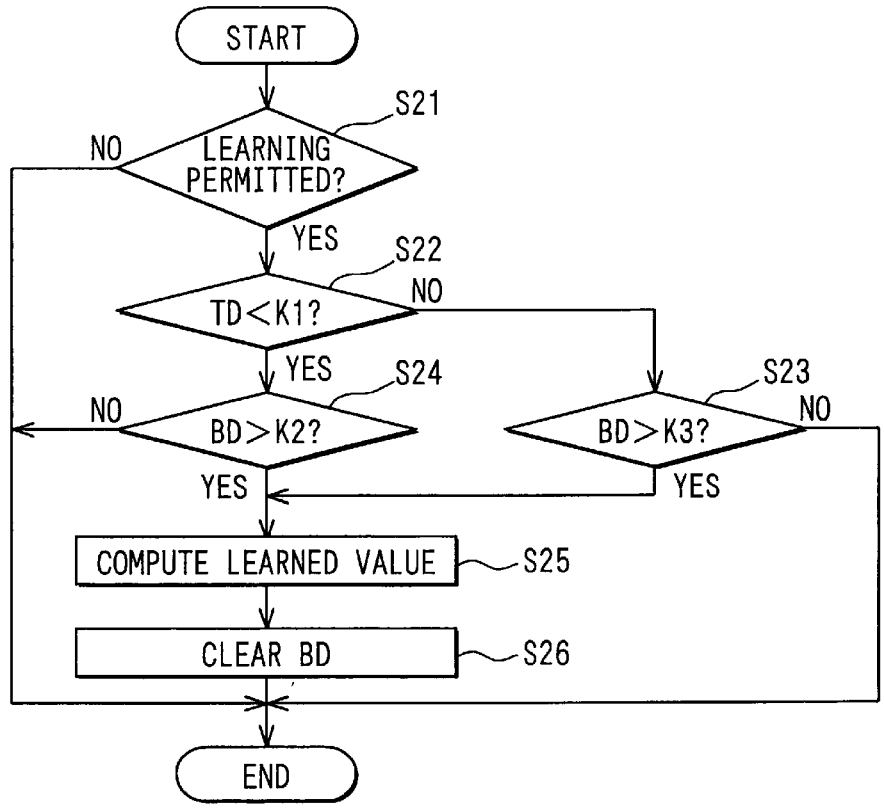
FIG. 21 is a flowchart of a correction frequency setting method according to a fourth embodiment of the present invention.

FIGS. 21 to 24 show a fourth embodiment according to the present invention. FIG. 21 is a flowchart of a correction frequency setting method of setting a correction frequency according to a distance traveled.

As mentioned above in connection with the first embodiment, when injection quantity correction corresponding to the scatter of actual injection quantities with respect to the TQ pulse time or secular change of injection quantity (secular functional deterioration of the injector) is performed by ISC correction and FCCB correction, a learned value is calculated in a state where the engine is in stable idling operation and the calculated learned value is reflected in other working regions. However, if there is no correlation between a state where the engine is in idling operation and a state where the engine is in operation other than idling operation in the scatter of actual injection quantities with respect to the TQ pulse time or the secular change of injection quantity (Secular functional deterioration of the injector, learned values must be calculated for all the operating conditions, such as fuel injection pressure.

The learning control of pilot injection quantity by the first embodiment calculates a learned value at a fixed correction frequency (for example, distance traveled by the vehicle). For example, if the injector 4 has a characteristic that does not decrease injection quantity at a fixed rate with time, secular change of injection quantity cannot be corrected if the correction frequency is excessively small or abnormal conditions, such as enhancement of combustion noise due to increase in fuel injection pressure, occur frequently when a learned value is calculated if the correction frequency is excessively large.

Those problems can be solved and an optimum learning correction frequency can be determined by setting a learning correction calculation frequency according to the secular change of the characteristic of the injector 4. For example, if a learning correction frequency is determined on the basis of distance traveled, the distance traveled corresponding to the interval between learning correction operations, i.e., distance traveled by the vehicle after the preceding learned value calculation, is changed according to a total distance traveled.

1) When, total distance traveled TD is shorter than K1, learning correction executing distance LD is K2.

2) When total distance traveled TD is not shorter than K1, learning correction executing distance LD is K3.

In 1) and 2), K1 is the learning correction frequency changing distance traveled, such as 10,000 km, K2 is the learning correction frequency 1, such as 1,000 km, and K3 is a learning correction frequency 2, such as 5,000 km.

At time to start the control routine shown in FIG. 21, a query is made in step S21 to see if a learning executing conditions, i.e., conditions for executing stable learning correction, such as stable idling, a running speed of 0 km/h and allowable environmental conditions, are valid. If the response to the query in step S21 is negative, i.e., if the learning executing conditions are invalid, the control routine shown in FIG. 21 is ended. If the response to the query in step S21 is affirmative, i.e., if the learning executing conditions are valid, a query is made in step s22 to see if the total distance traveled is less than K1. Although K1 is 10,000 km in this embodiment, the value of K1 is determined according to the aging characteristic of the injector 4.

If the response to the query in step S22 is negative, i.e., if the total distance traveled is not shorter than K1, a query is made in step S23 to see if the distance traveled BD after the preceding learning correction is longer than K3. If the response to the query in step S23 is affirmative, a learned value is calculated in step S25. If the response to the query in step S23 is negative, the control routine shown in FIG. 21 is ended. If the response to the query in step S22 is affirmative, i.e., if the total distance traveled TD is less than K1, a query is made in step S24 to see if the distance traveled BD after the preceding learning correction is longer than K2. If the response to the query in step S24 is negative, the control routine shown in FIG. 21 is ended. If the response to the query in step S23 or step S24 is affirmative, steps S3 to S12 of the control routine shown in FIG. 5 or FIG. 17 are executed in step S25 to calculate the present learned value. Then, the distance traveled after learning correction is cleared in step S26 and then the control routine shown in FIG. 21 is ended.

Figure 22:
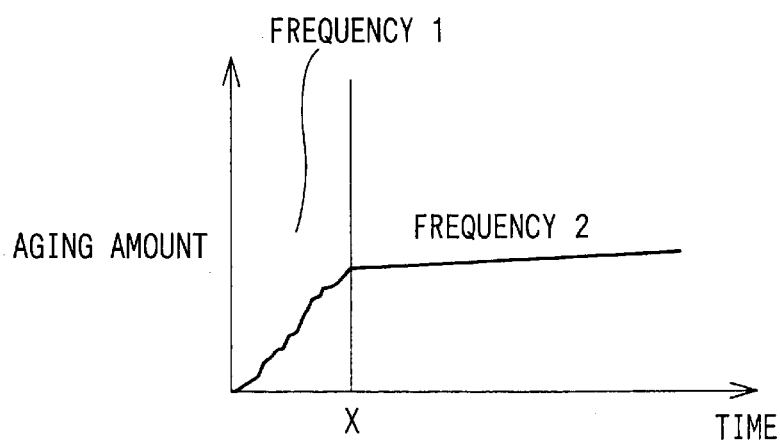
FIG. 22 is a time chart showing a secular change changing point according to the fourth embodiment of the present invention.
Figure 23:
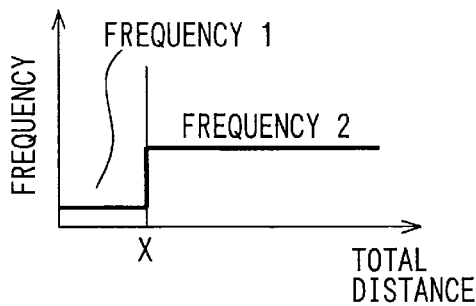
FIG. 23 is a graph representing the relation between correction executing distance (frequency) and total distance traveled according to the fourth embodiment of the present invention.
Figure 24:
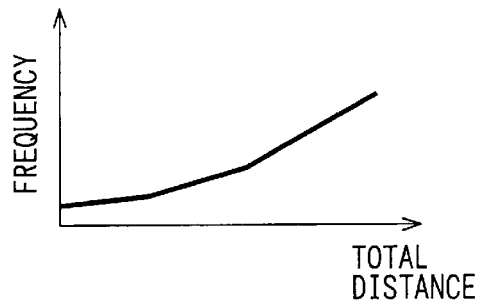
FIG. 24 is a graph representing the relation between correction executing distance (frequency) and total distance traveled according to the fourth embodiment of the present invention.

The two learning correction frequencies K2 and K3 are determined according to the characteristic, such as aged injection quantity change. Setting images are shown in FIGS. 22 and 23. Optimum learning correction frequencies for calculating learned corrections can be set according to the aging characteristic of the injector 4. Although this embodiment defines the learning correction frequency by the distance traveled, the learning correction frequency may be defined by any factor that is in correlation with aged injection quantity change, such as operating time. Although this embodiment changes the learning correction frequency in two stages using the constants, further precise learning correction can be achieved by using a continuously changing learning correction frequency changing with total distance traveled and expressed by an expression or a map as shown in FIG. 24.

Fifth Embodiment

Figure 25:
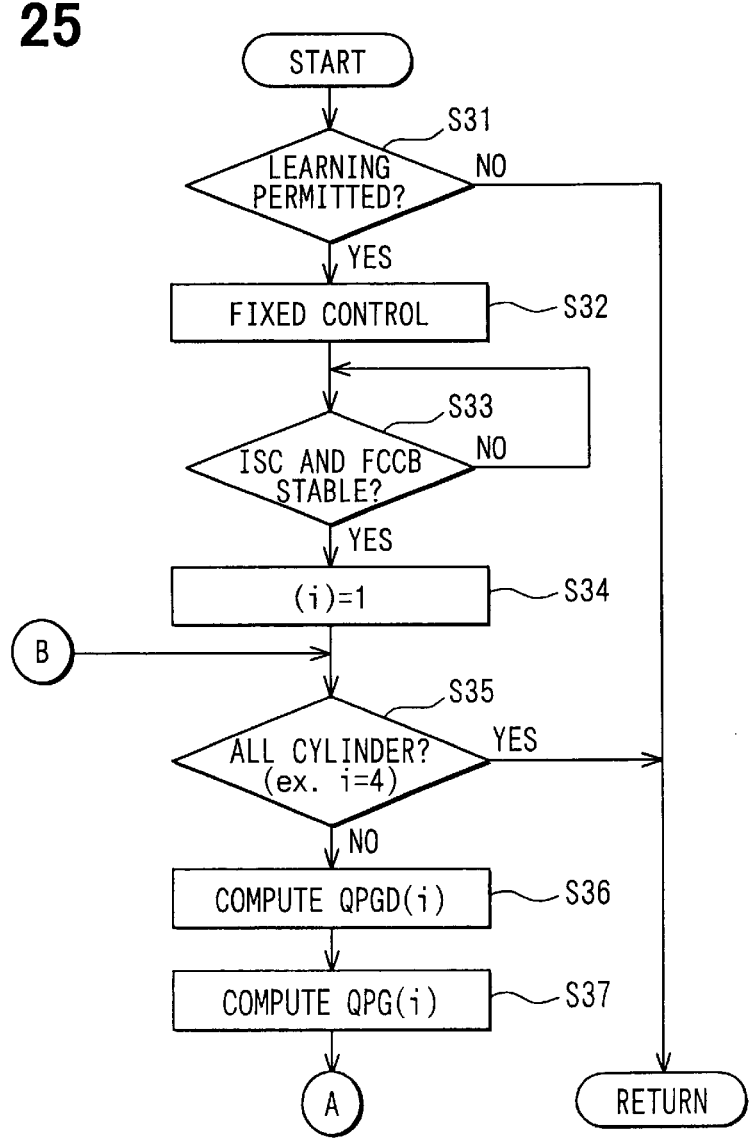
FIG. 25 is a flowchart of a method of preventing false learning or excessive learning according to a fifth embodiment of the present invention.
Figure 26:
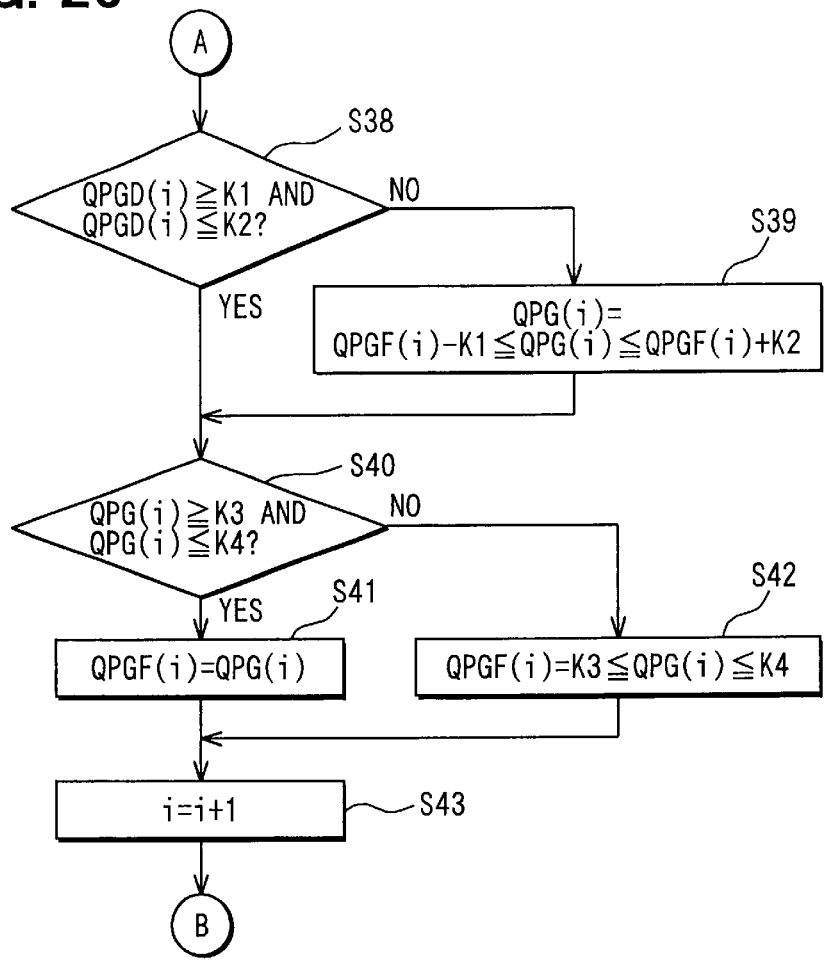
FIG. 26 is a flowchart of a method of preventing false learning or excessive learning according to the fifth embodiment of the present invention.

FIGS. 25 to 28 show a fifth embodiment according to the present invention. FIGS. 25 and 26 are flowcharts showing a method of preventing false learning or excessive learning.

As mentioned above in connection with the first embodiment, when injection quantity correction corresponding to the scatter of actual injection quantities with respect to the TQ pulse time or secular change of injection quantity (secular functional deterioration of the injector) is performed by ISC correction and FCCB correction, false learning occurs if a learned value is calculated in a state where fuel consumption is increased by the operation of the electric load or in a state where combustion is unstable when a learned value obtained by ISC correction or FCCB correction is reflected simply in the pilot injection quantity. Consequently, the pilot injection quantity is reduced to zero or is increased abnormally and the engine is unable to operate satisfactorily. The absolute value of the calculated learned value and the difference of the calculated learned value from the preceding learned value are examined to determine whether or not the calculated learned value is normal. If the learned value is abnormal, a command is given to repeat the learning operation or the following control routine is executed to prevent false learning by guarding with a value in the normal range and to make the engine exhibit an optimum performance.

At time for starting the control routine shown in FIG. 25, a query is made in step S31 to see if learning executing conditions are valid, i.e., if a learned value calculation frequency is valid and the engine is in a state of stable idling operation (state of idling fuel consumption). If the response to the query in step S31 is negative, the control routine shown in FIG. 25 is ended. If the response to the query in step S31 is affirmative, i.e., if the learning executing conditions are valid, learned value calculating injection a combustion pattern (five split injections and EGR cut) are carried out in step S32.

Similarly to the operation of the first embodiment, in step S33, learning correction of the scatter of actual injection quantities with respect to the TQ pulse time and secular change of injection quantity (secular functional deterioration of the injector) is executed using the mean engine speed correction (ISC correction) and inter-cylinder engine speed variation correction (FCCB correction) until the ISC correction and the FCC correction are stabilized. If the learning correction in step S33 is completed, the cylinder #1 is selected as learned value calculating cylinder in step S34. Then, a query is made instep S34 to see if the learned value calculation has been performed for all the cylinders. If the response to the query in step S35 is affirmative, the control routine shown in FIG. 25 is ended.

If the response to the query in step S35 is negative, a temporary learned value change QPGT is calculated in step S36. The temporary learned value change is a change relative to the present learned value, and is a secular injection quantity deterioration after the calculation of the preceding learned value. Then in step S37, the present false temporary learned value QPG is calculated by adding the existing learned value QPGF calculated by the preceding calculation to the temporary learned value change QPGD. Then, a control routine shown in FIG. 26 is executed. In step S38, it is decided whether or not the change is normal on the basis of the temporary learned value change QPGD, i.e., a query is made to see if QPGD$\geq$K1 and QPGD$\leq$k2.

Figure 27:
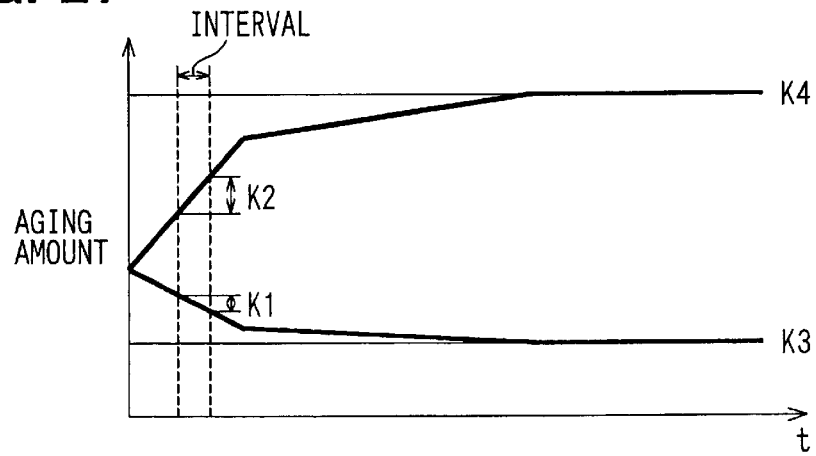
FIG. 27 is a diagram representing the relation between secular change and learned value calculating frequency according to the fifth embodiment of the present invention.
Figure 28:
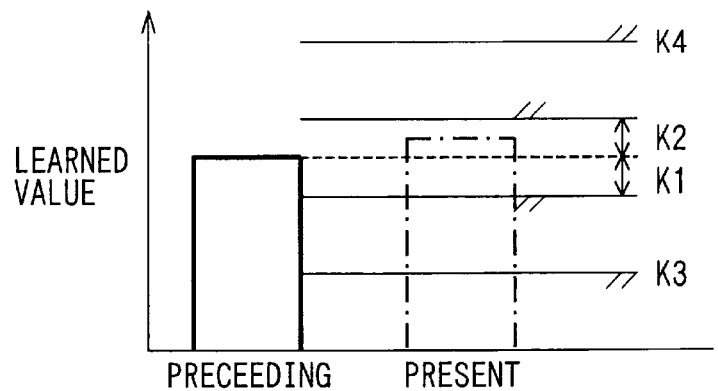
FIG. 28 is a diagram of assistance in explaining change guards and absolute value guard according to the fifth embodiment of the present invention.

It is decided that the change is normal if the response to the query in step S38 is affirmative, i.e., if the temporary learned value change QPGD is greater than the maximum decrement K1 and smaller than the maximum increment K2, and the control routine goes to step S40. The values of K1 and K2 may be so determined that abnormal injection quantity change attributable to the operation of the electric load and such can be prevented by setting a maximum change including the scatter of injection quantities from a secular injection quantity change pattern relative to the learning correction frequency of, for example, 10,000 km for the calculation of the learned value. FIG. 27 shows a set image. If the response to the query in step S38 is negative, i.e., if the change is abnormal, the QPG is set to a value guarded in the widest range of change in step S39, and then the control routine goes to step S40. Change guarding shown in FIG. 28 is performed with an intention to perform learning correction to the normal range even if an abnormal secular injection quantity change greater than an expected amount of scatter occurs. However, the preceding learned value may be used without performing guarding and without reflecting the present learned value in injection quantity to minimize the possibility of false learning.

Then, a query is made in step S40 to see if the absolute value of the learned value is normal on the basis of the present temporary learned value QPG, i.e., if QPG$\geq$K3 and QPG$\leq$K4. If the response to the query in step S40 is affirmative, i.e., if the present temporary learned value QPG is greater than the minimum value K3 and is smaller than the maximum value K4, it is decided that the absolute value of the temporary learned value QPG is normal, and the final learned value QPGF is set to the temporary learned value QPG in step S41. If the response to the query in step S40 is negative, i.e., if the absolute value of the temporary learned value QPG is abnormal, the final learned value QPGF is set to the value guarded by K3 and K4 in step S42. The reflection of the present learned value in the injection quantity may be omitted and the preceding learned value may be used.

After the completion of step s41 or S42, the cylinder number i is counted up in step S43, and the step S35 and the following steps are executed to calculate a final learned value QPGF for the next cylinder. After the completion of calculating final learned values QPGF for the last cylinder, the control routine is ended. The following method may be used instead of this embodiment.

This embodiment examines the learned value calculated for each cylinder to see if the calculated learned value is normal and performs the processes according to the result of examination. If even a learned value for a single cylinder is abnormal, the reflection of all the learned values for all the cylinders may be omitted and the preceding learned values may be used. In such an occasion, the learned value calculation may be decided to be incomplete and learning may be restarted immediately.

This embodiment does not reflect the learned value in guarding the learned value or injection quantity when the learned value is abnormal. It is highly possible that the injector 4 is in an abnormal condition where the opening or closing operation is abnormal if it is decided successively several times that the learned value is abnormal. In such a case, a warning lamp may be turned on to notify the driver that the injector 4 is malfunctioning and to prompt the driver to change the injector 4. The decision of the abnormal condition may be made in several steps. Although this embodiment makes an abnormality decision through two steps of examination of the change of the temporary learned value QPG and the absolute value of the learned value, an abnormality decision may be made through the step of examination of either the change of the temporary learned value QPG or the absolute value of the learned value. Although the criteria K1 to K4 used by this embodiment for abnormality decision are fixed values, those criteria may be variables that vary according to the aging characteristic of the injector. For example, the criteria K1 to K4 may be obtained by using expressions relating with distance traveled or from a one-dimensional map.

Figure 29:
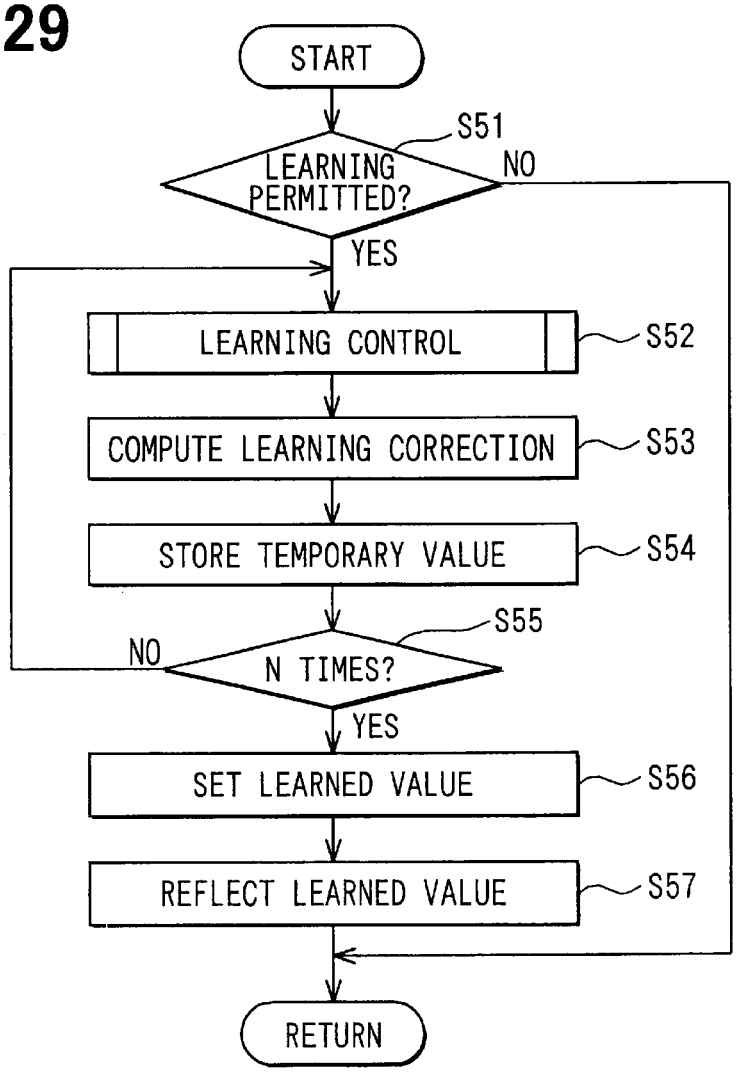
FIG. 29 is a flowchart of a learning control method of controlling pilot injection quantity according to a sixth embodiment of the present invention.
Figures 30, 31:
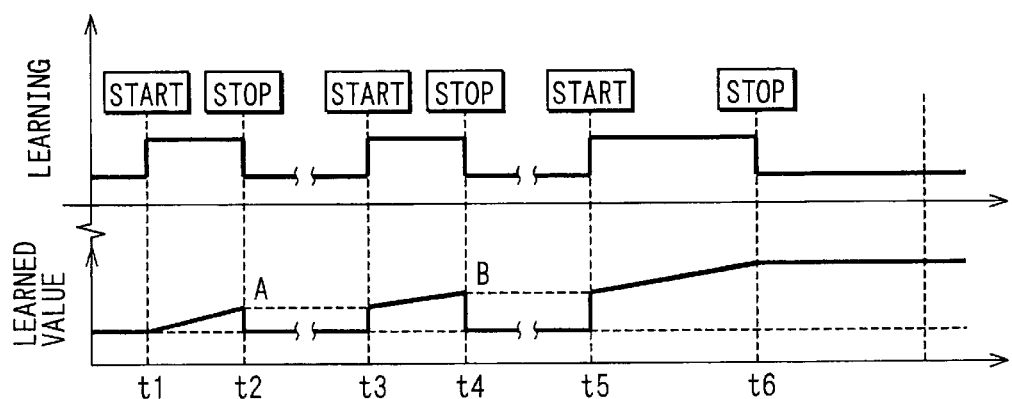
FIG. 30 is a map for storing learned values at a plurality of different injection pressure levels for cylinders according to the sixth embodiment of the present invention.
FIG. 31 is a time chart of assistance in explaining a control operation for reducing time necessary for completing pilot injection quantity learning according to a seventh embodiment of the present invention.

FIGS. 29 and 30 show a sixth embodiment according to the present invention. FIG. 29 is a flowchart of a learning control method of controlling pilot injection quantity.

As mentioned above in connection with the first embodiment, in performing injection quantity correction according to an amount of scatter of actual injection quantities with respect to the TQ pulse time or the secular change of injection quantity (secular functional deterioration of the injector), using the ISC correction and the FCCB correction, the sum of the ISC correction and the FCCB correction is divided in proportion to the total injection quantity of the pilot injection quantity and the main injection quantity to calculate the learned value. Therefore, false learning is performed and a learned value including an injection quantity requirement for idling operation (idling injection quantity) and an increment of an injection quantity demanded by the engine due to the change of the load on the engine is calculated. Even if the amount of scatter of actual injection quantities of the injector and the secular injection quantity deterioration are the same, the learned value includes an increment of an injection quantity demanded by the engine and, consequently, the injection quantity correction is excessively large as compared with a practically necessary learned value.

The sixth embodiment executes a learning operation several cycles, and uses the smallest value for the fuel injection pressure levels and the cylinders among temporary learned values determined through N cycles of a learning operation as a final learned value to prevent excessive injection quantity correction. If a learned value includes a value corresponding to a change in demanded injection quantity relating to load on the engine, the learned value is abnormal as compared with other learned values. Therefore, abnormal learned values and normal learned values can be discriminated from each other and hence the mean of the learned values excluding the abnormal learned values may be used. A concrete method of preventing excessive injection quantity correction due to false learning will be provided. A learning control procedure will be described in connection with a flowchart shown in FIG. 29.

At time to start a control routine shown in FIG. 29, a query is made in step S51 to see if learning executing conditions, i.e., conditions for executing stable learning correction, such as distance traveled, operating time of the engine, secular injection quantity change decision, the frequency of an ignition switch opening operation ands table idling state, are valid. If the response to the query in step S51 is negative, the control routine shown in FIG. 29 is ended. If the response to the query in step S51 is affirmative, for example, steps S3 to S8 of the control routine shown in FIG. 5 or 17 are executed in step S52, and then a learned value (learned correction, is calculated in step S53 by a method similar to that executed in step S9 of the control routine shown in FIG. 5 or 17.

A calculated learned value is written as a temporary learned value to a map shown in FIG. 30 for temporary storage (backup) in step S54 (temporary learned value storage means). Then, a query is made to see if a temporary learned value calculating operation (backup) has been repeated N times (three to five times) in step S55. If the response to the query in step S55 is negative, the temporary learned value calculating operation is repeated until the same is repeated N times, and calculated learned corrections are written successively to maps shown in FIG. 30 as temporary learned values and are stored temporarily in a memory.

If the response to the query in step S55 is affirmative, i.e., the temporary learned value calculating operation (backup) has been repeated N times, the N temporary learned values are compared, and the smallest one of the N temporary learned values is selected as a final learned value. For example, when learned values are A, B and C when the fuel injection pressure level for the cylinder #1 is 35 MPa as shown in FIG. 30, a MIN(A, B, C) is employed as a final learned value in step S56. After the determination of the final learned value, the final learned value is reflected in the calculation of a pilot injection quantity in step S57, and then the control routine shown in FIG. 29 is ended.

This embodiment repeats the learning operation several times to compensate for the change of engine-demanded injection quantity due to the change of load on the engine (power steering system electric load, air conditioning system) during learning control. The learning operation does not need to be repeated continuously, and the same may be repeated when a fixed condition becomes valid. The repetition of the learning operation, a learned value including a change in the requisite injection quantity due to the change of the load on the engine is abnormal as compared with other learned values. Thus, the normal learned values and the abnormal learned values can be discriminated from each other. Thus, the increase of combustion noise and vibrations of the engine, and the deterioration of emissions can be avoided, and a proper learned value can be reflected in injection quantity.

This embodiment stores the smallest one of the N temporary learned values as the final learned value in the memory to avoid false learning or excessive learning and reflects the final learned value in the calculation of the pilot injection quantity. The smallest one of three temporary learned values is employed as the final learned value to eliminate the influence of the variation of load on the engine because the greater the influence of the variation of the load on the engine, the greater is the temporary learned value. If it is decided that the present invention learning control is false learning or excessive learning, the learning operation, for example, steps S3 to S8 of the control routine shown in FIG. 5 or 17, is executed once immediately, and a temporary learned value obtained by the single learning operation is stored as a final learned value in the memory. The employment of the smallest one of the three temporary learned values as the final learned value is equivalent to finding false learning or excessive learning that could not be found by the learning value calculating level deciding process of step S10 of the control routine shown in FIG. 5. If false learning or excessive learning can be accurately decided by the process of step S10 of the control routine shown in FIG. 5, the temporary learned value obtained by the relearning control operation is necessarily a normal learned value.

Seventh Embodiment

FIG. 31 is a time chart of assistance in explaining a control operation for reducing time necessary for completing pilot injection quantity learning by a seventh embodiment according to the present invention.

As mentioned above in connection with the first embodiment, in performing the learning control of pilot injection quantity for correcting injection quantity corresponding to an amount of scatter of actual injection quantities with respect to the TQ pulse time and secular injection quantity change (secular functional deterioration of the injector) by using ISC correction and FCCB correction, the learning correction of pilot injection quantity continues indefinitely and the scatter of injection quantities and the correction of injection quantity for correcting a secular change of injection quantity cannot be achieved if the learning executing conditions are invalidated by operations, such as depression of the accelerator pedal and closing of the switch of the air conditioner, the heater or the fan, and learning control operation is suspended frequently.

As mentioned above in connection with the sixth embodiment, when temporary learned values are calculated for the cylinders for a plurality of different injection pressure levels, the calculated temporary values are written to a map as shown in FIG. 30 to store the same temporarily in a memory, it is desirable to calculate the temporary learned value again after an act to invalidate the learning executing conditions, such as depressing the accelerator pedal or making the vehicle travel a predetermined distance after the temporary learned value has been stored temporarily in the memory to avoid the coincidence of the present temporary learned value and the next temporary learned value, i.e., to avoid using the same environmental conditions. If the learning executing conditions are invalidated and the calculation of a temporary learned value to be written to the map as shown in FIG. 30 is started again from the beginning, the learning control operation for the learning correction of pilot injection quantity continues indefinitely and the correction of injection quantity corresponding to the amount of scatter of injection quantities or the secular change of injection quantity cannot be performed.

Therefore, this embodiment starts the present learning control operation from a learning state corresponding to that of the preceding learning control operation at the suspension of the preceding learning control operation if the preceding learning control operation is suspended due to the invalidation of the learning executing conditions, concerning a logic for the learning correction of an amount of scatter of actual injection quantities with respect to the command injection pulse time (TQ pulse time) for the injector 4. Thus, time necessary to complete the learning control operation can be reduced and the learning control operation for the learning correction of pilot injection quantity can be completed even if the learning control operation is suspended frequently.

More concretely, as shown in FIG. 31, when the learning control operation is started at time t1, and learning control operation is suspended due to the invalidity of the learning executing conditions at time t2, a learned value A obtained at the suspension of the learning control operation is stored in the memory. When the learning executing conditions becomes valid again at time t3, an initial value at the start of the learning control operation is set to the learned value A obtained at the suspension of the preceding learning control operation. If learning control operation is suspended again at time t4 due to the invalidity of the learning executing conditions, a learned value B obtained at the suspension of the learning control operation is stored in the memory. When the learning executing conditions become valid at time t5, an initial value at the start of the learning control operation is set to the learned value B at the suspension of the preceding learning control operation.

Thus, time necessary for completing the learning control operation can be reduced by using the learned value at the suspension of the preceding learning control operation as an initial value at the start of the succeeding learning control operation. Therefore, the learning correction of the pilot injection quantity can be surely achieved even if the learning control operation is suspended frequency or even if the learning control operation is suspended due to the learning executing conditions becoming invalid before the start of the next temporary learned value subsequently to the calculation of a temporary learned value. In setting an initial value for a learning control operation, the initial value may be set to zero by an additional selecting process when it is known through comparison that the present operating condition of the engine at the start of the present learning control operation is greatly different from the operating condition of the engine at the end of the preceding learning control operation or a value obtained by correcting a learned value at the end of the preceding learning control operation by an additional learned value correcting process may be used as an initial value for the present learning control operation.

Eighth Embodiment

Figure 32:
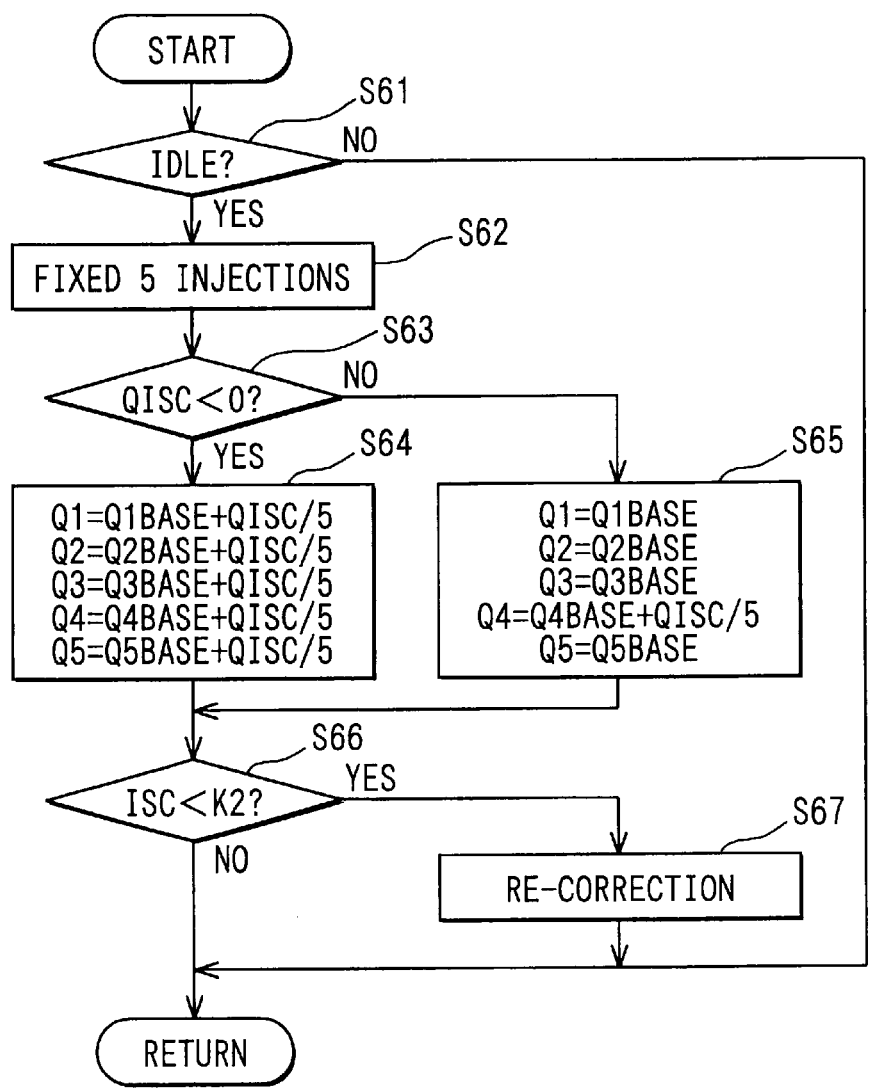
FIG. 32 is a flowchart of an ISC correction false correction detecting method according to an eighth embodiment of the present invention.
Figure 33:
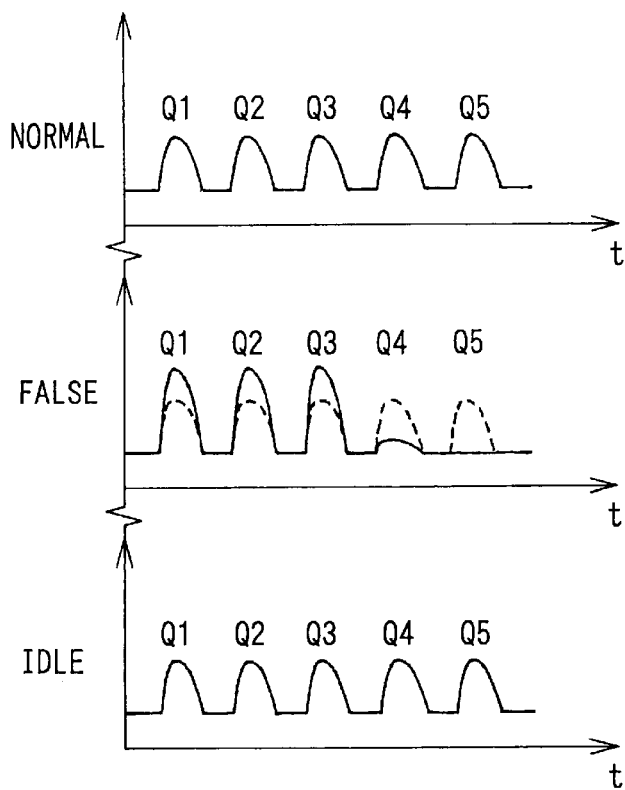
FIG. 33 is a diagram representing models of injection patterns in a normal state, in a false correction state and an idling state according to the eighth embodiment of the present invention.

FIGS. 32 and 33 show an eighth embodiment according to the present invention. FIG. 32 is a flowchart of a false correction deciding method to be applied to determining an ISC correction.

In calculating corrections for a plurality of different injection pressure levels of common rail pressure to improve the accuracy of correcting an amount of scatter of actual injection quantities with respect to the TQ pulse time or secular injection quantity change, combustion noise increases due to high-pressure injection during idling operation if the calculation of injection quantity corrections is executed continuously. Therefore, it is desirable to execute the calculation of injection quantity corrections at a predetermined frequency. However, if the calculation of injection quantity corrections are executed at the predetermined frequency without detecting the occurrence of unexpected rapid secular injection quantity change or a state in which the engine is loaded with an electric load, a state where the desired pilot injection quantity of fuel is not injected continues until the next injection quantity correction calculating operation is executed and the performance of the engine is deteriorated accordingly. This problem may be solved by a method that detects false correction caused by electric load or the like on the basis of an ISC correction during idling operation in which the learning control operation is not executed. However, the fuel is injected in an injection pattern different from that for the normal idling operation and the accuracy of detection is reduced if the false correction is large.

This embodiment compares a desired engine speed corresponding to engine load and idling speed during idling operation, and executes an ordinary idling speed control operation (ISC operation) for the feedback control of injector driving current (command injection quantity=injector driving period=TQ pulse time) to be supplied to the injector 4 according to the result of comparison after the completion of the learning control operation of pilot injection quantity to improve the accuracy of false learning detection by fixing an injection pattern for idling operation after the completion of learning control operation. The number N of injection cycles for the injector 4 of each cylinder is fixed, for example, at five, and a characteristic map capable of providing a command injection quantity QFIN=total−Q=0 mm$^3$/st is used to maintain the idling speed at the desired idling speed.

At time for starting a control routine shown in FIG. 32, a query is made in step S61 to see if the engine is in an idling state where the engine speed is not higher than a predetermined engine speed NE of, for example, 1,000 rpm, the acceleration stroke ACCP is not greater than a predetermined value of, for example 0%, and the running speed SPD of the vehicle is not higher than a predetermined running speed of, for example, 0 km/h. If the response to the query in step S61 is negative, the control routine shown in FIG. 32 is ended.

If the response to the query in step S61 is affirmative, i.e., if the engine is in the idling operation, the number N of injection cycles is fixed at a fixed value, such as five, in step S62. Generally, the number of injection cycles must be limited by a minimum injection quantity. For example, when a minimum injection quantity is a and an injection quantity is 4a or below, each of five injection cycles injects an injection quantity not greater than the minimum injection quantity unless the number of injection cycles is four or below. Since false learning calculates a pilot injection quantity in a state where the load on the engine is increased by an electric load or the like, idling injection quantity for idling operation increases, and a command injection quantity is smaller than an idling fuel consumption by a quantity corresponding to false learning.

Therefore, if the number of injection cycles is limited ordinarily and when false correction for ISC correction QISC is large, such as minimum injection quantity a=0.5 mm$^3$/st, idling fuel consumption b=5 mm$^3$/st and false correction c=3 mm$^3$/st, the command injection quantity for idling operation is (b−c), and the number of injection cycles at the minimum injection quantity is limited to four. In such a state, the influence of the false correction for the ISC correction QISC is 4/5, and false learning deciding level does not coincide with a set value. Since a necessary injection quantity for idling operation in which any load is not placed on the engine never decreases and hence the number of injection cycles does not need to be limited by the small injection quantity, the number of injection cycles can be fixed at five.

A query is made in step S63 to see if the ISC correction QISC is below zero. If the response to the query in step S63 is affirmative, i.e., if the ISC correction QISC is below zero, the ISC correction QISC is reflected uniformly in all the injection cycles in step S64. If the response to the query in step S63 is negative, i.e., if the ISC correction QISC is not smaller than zero, the ISC correction QISC is reflected in only a main injection cycle in step S65. Then, a query is made in step S66 to see if the ISC correction QISC is smaller than a predetermined value (false correction criterion) K2. If the response to the query in step S66 is negative, the control routine shown in FIG. 32 is ended. If the response to the query in step S66 is affirmative, the learning control defined by the control routine shown in FIG. 3 is executed again in step S67 to calculate a learned value again in step S66, and then the control routine shown in FIG. 32 is ended.

According to this idea, the ISC correction is made only for the main injection cycle to prevent the pilot injection quantity from increasing with the increase of the load on the engine. If false correction is made, the main injection quantity decreases because actual pilot injection quantity is large if the ISC correction QISC is reflected in only the main injection cycle. It is possible, in such a case, that a false correction cannot be correctly decided on the basis of the ISC correction QISC. Since the idling injection quantity (idling fuel consumption) does not decrease according to the foregoing idea when QISC<0, it is possible to decide that the ISC correction is faultly corrected in connection with the increase of the load on the engine. Therefore, when QISC<0, the ISC correction QISC can be substantially uniformly reflected in calculating injection quantities for all the injection cycles. Injection in an injection pattern similar to a normal injection pattern can be achieved even after the false correction of the ISC correction QISC as shown in FIG. 33 through the fixation of the number of injection cycles and the change of a method of reflecting the ISC correction QISC, and thus, the accuracy of deciding false correction by the ISC correction QISC can be improved. When there is no any problem in the performance of the engine, the effect of this embodiment can be exercised by the substantially uniform ISC correction of all the injection cycles including the pilot injection cycle when the load on the engine increases.

Ninth Embodiment

Figure 34:
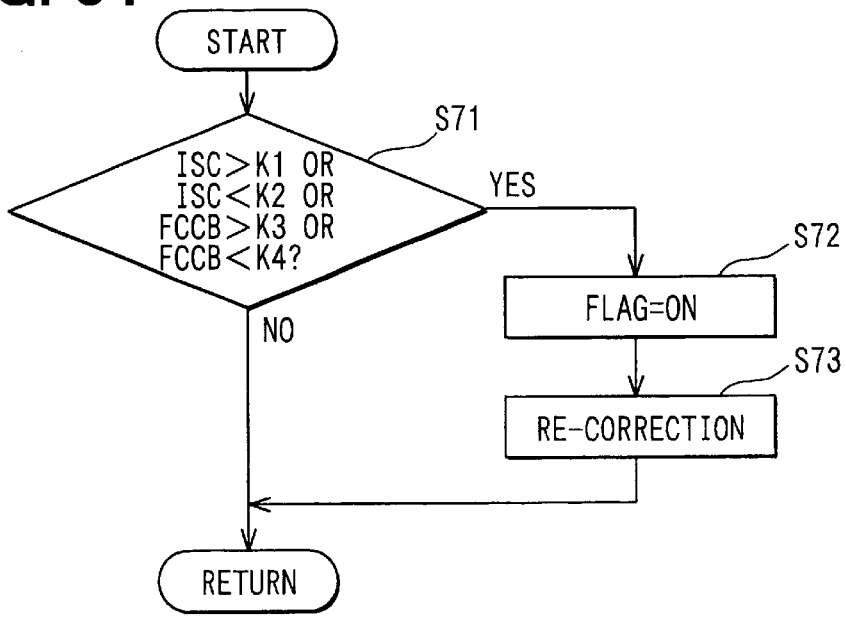
FIG. 34 is a flowchart of a pilot injection quantity learning control method according to a ninth embodiment of the present invention.
Figure 35:
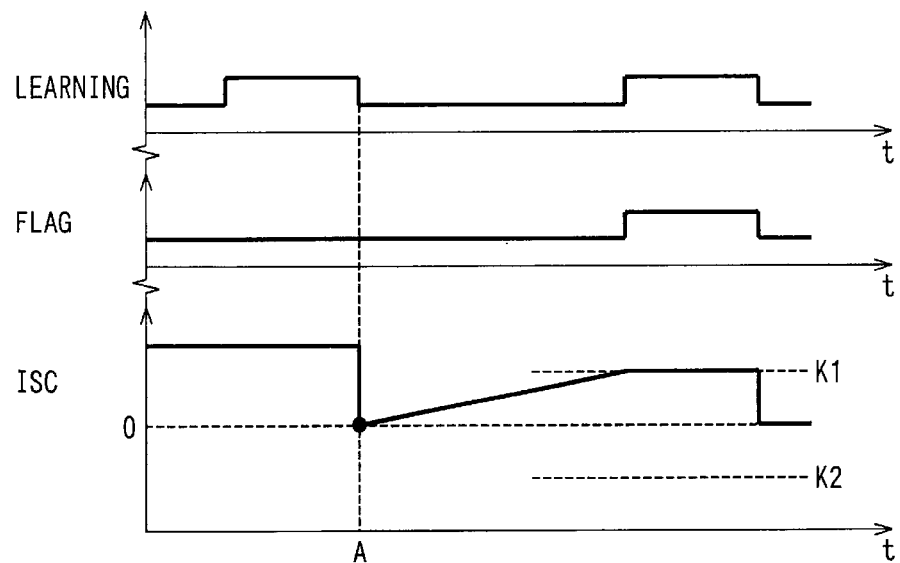
FIG. 35 is a diagram representing patterns of secular change according to the ninth embodiment of the present invention.
Figure 36:
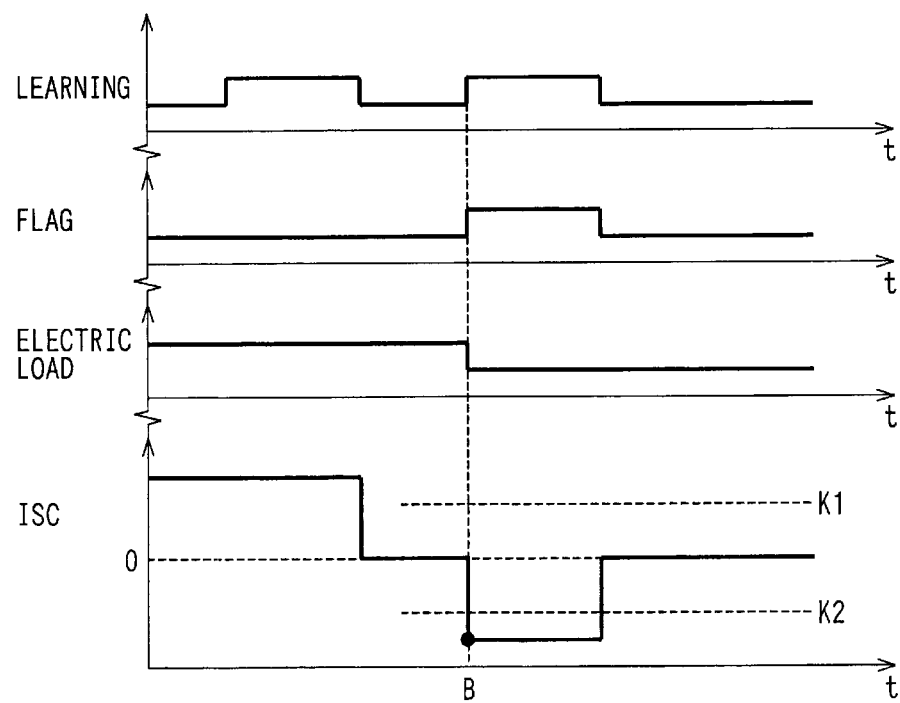
FIG. 36 is a diagram representing patterns of false correction according to the ninth embodiment of the present invention.

FIGS. 34 to 36 show a ninth embodiment according to the present invention. FIG. 34 is a flowchart of a learning control method of controlling pilot injection quantity.

In calculating corrections for a plurality of different injection pressure levels of common rail pressure to improve the accuracy of correcting an amount of scatter of actual injection quantities with respect to the TQ pulse time or secular injection quantity change, combustion noise increases due to high-pressure injection during idling operation if the calculation of injection quantity corrections is executed continuously. Therefore, it is desirable to execute the calculation of learned values at a predetermined frequency. However, if the calculation of corrections are executed at the predetermined frequency without detecting the occurrence of unexpected rapid secular injection quantity change or a state in which the engine is loaded with an electric load, a state where the desired pilot injection quantity of fuel is not injected continues until the next correction calculating operation is executed and the performance of the engine is deteriorated accordingly.

This embodiment detects false learning attributable to the secular injection quantity change or electric load on the basis of an FCCB correction and an ISC correction calculated by pilot injection quantity learning control while the engine is in a stable idling operation, corrects the deviation of an actual injection quantity with respect to the TQ pulse time and the deviation of secular injection quantity change by calculating an FCCB correction, an ISC correction and a learned value again to enable the engine exhibit its optimum performance. Thus, this embodiment executes a control routine shown in FIG. 34 in a stable idling state other than a state where learning executing conditions are valid.

At time for starting the control routine shown in FIG. 34, secular injection quantity change and false correction are detected on the basis of an ISC correction QISC (or QISC/n) uniformly for all the cylinders and FCCB corrections $\Delta Qc$ (or $\Delta Qc/n$) respectively for the cylinders in step S71. That is, a query is made to see if the ISC correction is greater than a predetermined value K1, if the ISC correction is smaller than a predetermined value K2, if the FCCB correction is greater than a predetermined value K3 or if the FCCB is smaller than a predetermined value K4. If the response to the query in step S71 is negative, the control routine shown in FIG. 34 is ended.

If the response to the query in step S71 is affirmative, that is, if the ISC correction is greater than a predetermined value K1 or the FCCB correction is greater than a predetermined value K3, or if the ISC correction is smaller than a predetermined value K2 or the FCCB is smaller than a predetermined value K4, it is decided that secular injection quantity change and false correction have occurred and a secular change/false correction flag is set (ON) in step S72, and then the learning control represented by the control routine shown in FIG. 5 is executed immediately in step S73 to calculate a learned value again, and then steps S71 to S73 are repeated.

A secular change pattern will be described with reference to FIG. 35.

When secular injection quantity change occurs, the ISC correction is zero at time A when the calculation of the ISC correction is completed, to have an injection quantity correction corresponding to the amount of scatter of injection quantities. Then, for example, when the injection quantity changes with time to decrease injection quantity, idling speed decreases, ISC operates to increase the injection quantity to the idling injection quantity (idling fuel consumption) and the ISC correction increases. Since ISC correction=secular injection quantity reduction, secular injection quantity change can be detected by comparing ISC correction with a predetermined value.

The ISC correction=0 if the operating condition is the same as that under which the ISC correction is calculated. Actually, the ISC correction does not become zero due to the variation of environmental conditions, the variation of the command injection quantity according to the operating state of the engine and the variation of load on the engine. Therefore, the predetermined values K1 to K4 must be not smaller than those variations. The predetermined values K1 to K4 may be those not greater than a level that permits the deterioration of the ability of the injector due to secular injection quantity change. When the FCCB correction for a cylinder is excessively large, it is possible to decide that the injector 4 for the cylinder is malfunctioning. In such a case, a warning lamp may be turned on to prompt the driver to change the injector 4.

The ISC correction and the FCCB correction differ from each other in effect on decision. The ISC correction can be used only for the detection of the secular injection quantity change of multiple cylinders, while the FCCB correction can be used even for the detection of the secular injection quantity changes in individual cylinders. If scatter requires setting a criterion of a or above, secular injection quantity changes for a×(Number of cylinders) are necessary to use the ISC correction as a criterion. If the value for a single cylinder is a or above, a secular injection quantity change in the same cylinder can be detected when the FCCB correction is used.

A false correction pattern due to electric load or the like will be described with reference to FIG. 36.

When the ISC correction is calculated with the electric load in an on-state, a false injection quantity correction corresponding to the electric load is added to a correction to be determined. When the electric load is removed after the calculation of the ISC correction, the idling injection quantity (idling fuel consumption) for idling operation decreases and engine speed rises. Therefore, ISC is executed to decrease the injection quantity and the ISC correction decreases. Since the ISC correction is equal to a false correction, false detection can be detected by comparing this value with a predetermined value. Only K2 is used to decide whether or not the ISC correction is smaller than a predetermined value.

The following method may be used instead of the method in this embodiment.

In calculating ISC corrections of a plurality of different injection pressure levels according to common rail pressures, decision cannot be made when the maintenance change of, for example, the second level is large or when false correction is made with the electric load in an on-state only for the second level. In such a case, the common rail pressure is changed and secular injection quantity change and false correction may be detected by each injection pressure.

First Modification

The foregoing embodiments are examples of the application of the present invention to a pilot injection quantity learning controller included in a common rail type fuel injection system for a diesel engine. The present invention is applicable to an injection quantity controller for an internal combustion engine provided with an electronically controlled distribution type fuel injection pump or an electronically controlled in-line fuel injection pump. Although the foregoing embodiment employs an injector provided with an electromagnetic fuel injection valve, the present invention may employ an injector provided with a piezoelectric fuel injection valve. The number of pilot injection cycles (pre-injection cycles) preceding a main injection cycle is optional, and the number of pilot injection cycles (after injection) may be zero or any optional number.

Second Modification

Although the foregoing embodiments divide the total injection quantity equally accurately into N split injection quantities for N injection cycles in step S4 of the control routine shown in FIG. 5, the total injection quantity does not need necessarily to be divided accurately equally into N split injection quantities. The total–Q of 5 mm$^3$/st may be divided approximately equally into four split injection quantities of 1 mm$^3$/st, 1 mm$^3$/st, 1 mm$^3$/st and 2 mm$^3$/st for four injection cycles, the FCCB correction (first injection correction or first correction) and the ISC correction (second injection quantity correction or second correction) shown in FIG. 11 may be reflected equally or in proportion to the dividing ratio of 1:1:1:2 of the split injection quantities in the injection cycles, and the calculation of the learned value in step S9 of the control routine shown in FIG. 5 may be executed. The effect of the second modification is substantially the same as that of the foregoing embodiment.

Third Modification

Although the foregoing embodiments employ the standby RAM or the EEPROM as the storage device for storing the temporary learned value and the learned value, a nonvolatile memory, such as an EPROM or a flash memory, or other storage medium, such as a DVD-ROM, CD-ROM or a flexible disk may be used for storing the preceding learned value updated by the preceding learning control instead of the standby RAM or the EEPROM. In such a case, the contents of the storage device are retained after the ignition switch has been opened or after the engine key has been extracted from the ignition switch.

Fourth Modification

Although the foregoing embodiments are applications of the present invention to the common rail type fuel injection system that drives the electromagnetic valve of the injector 4 for the specific cylinder of the engine 1 several times to perform at least two injection cycles, such as a pilot injection cycle and a main injection cycle, during each expansion stroke of the engine 1, the present invention is applicable to a fuel injection system, for an internal combustion engine, capable of performing three injection cycles, such as a pilot injection cycle, a main injection cycle, and an after or pilot injection cycle, to a fuel injection system, for an internal combustion engine, capable of performing four injection cycles, such as a pilot injection cycle, a main injection cycle, an after injection cycle, a post or pilot injection cycle, a pre-injection cycle, a main injection cycle and an after injection cycle, to a fuel injection system for an internal combustion engine, capable of performing five injection cycles, such as a pilot injection cycle, a pre-injection cycle, a main injection cycle, an after injection cycle and a post injection cycle or three injection cycles, such as a pilot injection cycle, a main injection cycle and an after injection cycle, to a fuel injection system, for an internal combustion engine, capable of performing at least six injection cycles, such as four or more pilot injection cycles, a main injection cycle, and an after injection cycle or such as three or more pilot injection cycles, a main injection cycle and two or more after injection cycles.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A fuel injection control system for an engine, for calculating a command injection pulse time for which a fuel injector is to inject fuel on the basis of a fuel injection quantity and a fuel injection pressure, which are determined according to the operating condition of the engine or operating conditions for the engine, and for driving the fuel injector according to the calculated command injection pulse time, the system comprising:

(a) an injection quantity determining means for calculating a learning control mode injection quantity according to the operating condition of the engine when learning executing conditions dependent on a predetermined operating condition of the engine or the operating conditions are valid;

(b) a uniform split injection time correcting means for dividing learning control mode injection quantity set by the injection quantity determining means substantially uniformly for n injection cycles while the n injection cycles are performed, for achieving inter-cylinder engine speed variation correction to smooth inter-cylinder engine speed variations by measuring engine speed variation in each cylinder and comparing the measured engine speed variations in all the cylinders with the mean value of engine speed variations in all the cylinders, and for achieving mean engine speed correction to maintain the mean engine speed at a desired engine speed by measuring mean engine speed while the n injection cycles are performed, and comparing the mean engine speed with the desired engine speed;

(c) a first correction calculating means for calculating, for each cylinder, a first quantity correction corresponding to the deviation of a measured engine speed variation in each cylinder from the mean engine speed variation of engine speed variations in all the cylinders;

(d) a second correction calculating means for calculating a uniform second correction for all the cylinders necessary to maintain the mean engine speed at the desired engine speed; and (e) a learned value storage means for updating and storing a learned value for each cylinder obtained by adding up a value obtained by dividing the first correction for each cylinder by n, a value obtained by dividing the uniform second correction for all the cylinders by n, and a learned value obtained in a preceding control cycle, wherein
  the learned value storing means is arranged to repeat a learning control operation for updating and storing the learned value after the calculation of the learned value for a plurality of times while inter-cylinder engine speed variation correction and mean engine speed correction are being carried out, and comprises
  a temporary learned value storage means for updating and storing temporary learned values calculated by performing the learning control operation a plurality of times, and
  a setting means for setting a minimum value for each fuel injection pressure and each cylinder among the temporary learned values as a final learned value.

2. A fuel injection control system for an engine, for calculating a command injection pulse time for which a fuel injector is to inject fuel on the basis of a fuel injection quantity and a fuel injection pressure, which are determined according to the operating condition of the engine or operating conditions for the engine, and for driving the fuel injector according to the calculated command injection pulse time, the system comprising:
  (a) an injection quantity determining means for calculating a learning control mode injection quantity according to the operating condition of the engine when learning executing conditions dependent on a predetermined operating condition of the engine or the operating conditions are valid;
  (b) a uniform split injection time correcting means for dividing learning control mode injection quantity set by the injection quantity determining means substantially uniformly for n injection cycles while the n injection cycles are performed, for achieving inter-cylinder engine speed variation correction to smooth inter-cylinder engine speed variations by measuring engine speed variation in each cylinder and comparing the measured engine speed variations in all the cylinders with the mean value of engine speed variations in all the cylinders, and for achieving mean engine speed correction to maintain the mean engine speed at a desired engine speed by measuring mean engine speed while the n injection cycles are performed, and comparing the mean engine speed with the desired engine speed;
  (c) a first correction calculating means for calculating, for each cylinder, a first quantity correction corresponding to the deviation of a measured engine speed variation in each cylinder from the mean engine speed variation of engine speed variations in all the cylinders;
  (d) a second correction calculating means for calculating a uniform second correction for all the cylinders necessary to maintain the mean engine speed at the desired engine speed;
  (e) a learned value storage means for updating and storing a learned value for each cylinder obtained by adding up a value obtained by dividing the first correction for each cylinder by n, a value obtained by dividing the uniform second correction for all the cylinders by n, and a learned value obtained in a preceding control cycle; and
    a false learning detecting means for detecting false learning and for providing a command requesting executing the learning control operation from the beginning again when the uniform second correction for all the cylinders is smaller than a predetermined value under conditions other than the learning executing conditions.

3. A fuel injection control system for an engine, for calculating a command injection pulse time for which a fuel injector is to inject fuel on the basis of a fuel injection quantity and a fuel injection pressure, which are determined according to the operating condition of the engine or operating conditions for the engine, and for driving the fuel injector according to the calculated command injection pulse time, the system comprising:
  (a) an injection quantity determining means for calculating a learning control mode injection quantity according to the operating condition of the engine when learning executing conditions dependent on a predetermined operating condition of the engine or the operating conditions are valid;
  (b) a uniform split injection mode correcting means for dividing learning control time injection quantity set by the injection quantity determining means substantially uniformly for n injection cycles while the n injection cycles are performed, for achieving inter-cylinder engine speed variation correction to smooth inter-cylinder engine speed variations by measuring engine speed variation in each cylinder and comparing the measured engine speed variations in all the cylinders with the mean value of engine speed variations in all the cylinders, and for achieving mean engine speed correction to maintain the mean engine speed at a desired engine speed by measuring mean engine speed while the n injection cycles are performed, and comparing the mean engine speed with the desired engine speed;
  (c) a first correction calculating means for calculating, for each cylinder, a first quantity correction corresponding to the deviation of a measured engine speed variation in each cylinder from the mean engine speed variation of engine speed variations in all the cylinders;
  (d) a second correction calculating means for calculating a uniform second correction for all the cylinders necessary to maintain the mean engine speed at the desired engine speed;
  (e) a learned value storage means for updating and storing a learned value for each cylinder obtained by adding up a value obtained by dividing the first correction for each cylinder by n, a value obtained by dividing the uniform second correction for all the cylinders by n, and a learned value obtained in a preceding control cycle; and
    a false learning detecting means for detecting false learning and for providing a command requesting not storing the present learned value and executing the learning control operation from the beginning again or requesting inhibiting or suspending the learning control operation, when the difference between a learned value obtained by the preceding learning cycle and the learned value obtained by the present learning cycle is outside a predetermined range or an integrated learned value is greater than a predetermined value.

4. A fuel injection control system for an engine, for calculating a command injection pulse time for which a fuel injector is to inject fuel on the basis of a fuel injection quantity and a fuel injection pressure, which are determined according to the operating condition of the engine or operating conditions for the engine, and for driving the fuel injector according to the calculated command injection pulse time, the system comprising:

(a) an injection quantity determining means for calculating a learning control mode injection quantity according to the operating condition of the engine when learning executing conditions dependent on a predetermined operating condition of the engine or the operating conditions are valid;

(b) a uniform split injection time correcting means for dividing learning control mode injection quantity set by the injection quantity determining means substantially uniformly for n injection cycles while the n injection cycles are performed, for achieving inter-cylinder engine speed variation correction to smooth inter-cylinder engine speed variations by measuring engine speed variation in each cylinder and comparing the measured engine speed variations in all the cylinders with the mean value of engine speed variations in all the cylinders, and for achieving mean engine speed correction to maintain the mean engine speed at a desired engine speed by measuring mean engine speed while the n injection cycles are performed, and comparing the mean engine speed with the desired engine speed;

(c) a first correction calculating means for calculating, for each cylinder, a first quantity correction corresponding to the deviation of a measured engine speed variation in each cylinder from the mean engine speed variation of engine speed variations in all the cylinders;

(d) a second correction calculating means for calculating a uniform second correction for all the cylinders necessary to maintain the mean engine speed at the desired engine speed;

(e) a learned value storage means for updating and storing a learned value for each cylinder obtained by adding up a value obtained by dividing the first correction for each cylinder by n, a value obtained by dividing the uniform second correction for all the cylinders by n, and a learned value obtained in a preceding control cycle; and a false learning detecting means for detecting false learning and for providing a command requesting inhibition or suspension of the learning control operation, upon the increase of the uniform second injection quantity correction for all the cylinders from the start of the learning control operation by a value greater than a predetermined value.

5. A fuel injection control system for an engine, for calculating a command injection pulse time for which a fuel injector is to inject fuel on the basis of a fuel injection quantity and a fuel injection pressure, which are determined according to the operating condition of the engine or operating conditions for the engine, and for driving the fuel injector according to the calculated command injection pulse time, the system comprising:

(a) an injection quantity determining means for calculating a learning control mode injection quantity according to the operating condition of the engine when learning executing conditions dependent on a predetermined operating condition of the engine or the operating conditions are valid;

(b) a uniform split injection time correcting means for dividing learning control mode injection quantity set by the injection quantity determining means substantially uniformly for n injection cycles while the n injection cycles are performed, for achieving inter-cylinder engine speed variation correction to smooth inter-cylinder engine speed variations by measuring engine speed variation in each cylinder and comparing the measured engine speed variations in all the cylinders with the mean value of engine speed variations in all the cylinders, and for achieving mean engine speed correction to maintain the mean engine speed at a desired engine speed by measuring mean engine speed while the n injection cycles are performed, and comparing the mean engine speed with the desired engine speed;

(c) a first correction calculating means for calculating, for each cylinder, a first quantity correction corresponding to the deviation of a measured engine speed variation in each cylinder from the mean engine speed variation of engine speed variations in all the cylinders;

(d) a second correction calculating means for calculating a uniform second correction for all the cylinders necessary to maintain the mean engine speed at the desired engine speed;

(e) a learned value storage means for updating and storing a learned value for each cylinder obtained by adding up a value obtained by dividing the first correction for each cylinder by n, a value obtained by dividing the uniform second correction for all the cylinders by n, and a learned value obtained in a preceding control cycle; and a learned value correcting means that uses a value obtained by tempering the learned value with a correction coefficient serving as a measure of the characteristics of a fuel injection system as a learned correction.

6. A fuel injection control system for an engine, for calculating a command injection pulse time for which a fuel injector is to inject fuel on the basis of a fuel injection quantity and a fuel injection pressure, which are determined according to the operating condition of the engine or operating conditions for the engine, and for driving the fuel injector according to the calculated command injection pulse time, the system comprising:

(a) an injection quantity determining means for calculating a learning control mode injection quantity according to the operating condition of the engine when learning executing conditions dependent on a predetermined operating condition of the engine or the operating conditions are valid;

(b) a uniform split injection time correcting means for dividing learning control mode injection quantity set by the injection quantity determining means substantially uniformly for n injection cycles while the n injection cycles are performed, for achieving inter-cylinder engine speed variation correction to smooth inter-cylinder engine speed variations by measuring engine speed variation in each cylinder and comparing the measured engine speed variations in all the cylinders with the mean value of engine speed variations in all the cylinders, and for achieving mean engine speed correction to maintain the mean engine speed at a desired engine speed by measuring mean engine speed while the n injection cycles are performed, and comparing the mean engine speed with the desired engine speed;

(c) a first correction calculating means for calculating, for each cylinder, a first quantity correction corresponding to the deviation of a measured engine speed variation in each cylinder from the mean engine speed variation of engine speed variations in all the cylinders;

(d) a second correction calculating means for calculating a uniform second correction for all the cylinders necessary to maintain the mean engine speed at the desired engine speed; and (e) a learned value storage means for updating and storing a learned value for each cylinder obtained by adding up a value obtained by dividing the first correction for each cylinder by n, a value obtained by dividing the uniform second correction for all the cylinders by n, and a learned value obtained in a preceding control cycle, wherein the learned value storage means comprises a temporary learned value storage means for repeating a learning control operation for calculating the learned value and for updating and storing the learned value while the inter-cylinder engine speed variation correction and the mean engine speed correction are being carried out, and for updating and storing a plurality of temporary learned values calculated by repeating the learning control operation a plurality of times, and a learned value correcting means that uses a value obtained by tempering the temporary learned value with a correction coefficient serving as a measure of the characteristics of a fuel injection system as a learned correction.

7. A fuel injection control system for an engine, for calculating a command injection pulse time for which a fuel injector is to inject fuel on the basis of a fuel injection quantity and a fuel injection pressure, which are determined according to the operating condition of the engine or operating conditions for the engine, and for driving the fuel injector according to the calculated command injection pulse time, the system comprising:

(a) an injection quantity determining means for calculating a learning control mode injection quantity according to the operating condition of the engine when learning executing conditions dependent on a predetermined operating condition of the engine or the operating conditions are valid;

(b) a uniform split injection time correcting means for dividing learning control mode injection quantity set by the injection quantity determining means substantially uniformly for n injection cycles while the n injection cycles are performed, for achieving inter-cylinder engine speed variation correction to smooth inter-cylinder engine speed variations by measuring engine speed variation in each cylinder and comparing the measured engine speed variations in all the cylinders with the mean value of engine speed variations in all the cylinders, and for achieving mean engine speed correction to maintain the mean engine speed at a desired engine speed by measuring mean engine speed while the n injection cycles are performed, and comparing the mean engine speed with the desired engine speed;

(c) a first correction calculating means for calculating, for each cylinder, a first quantity correction corresponding to the deviation of a measured engine speed variation in each cylinder from the mean engine speed variation of engine speed variations in all the cylinders;

(d) a second correction calculating means for calculating a uniform second correction for all the cylinders necessary to maintain the mean engine speed at the desired engine speed;

(e) a learned value storage means for updating and storing a learned value for each cylinder obtained by adding up a value obtained by dividing the first correction for each cylinder by n, a value obtained by dividing the uniform second correction for all the cylinders by n, and a learned value obtained in a preceding control cycle; and a learned value calculating means that determines the learned value to be calculated under the predetermined operating condition of the engine by subtracting a change in an engine injection quantity requirement set according to load on the engine and the variation of combustion condition from the sum of the first injection quantity correction and the second injection quantity correction or adding the same to the sum of the first injection quantity correction and the second injection quantity correction.

8. A fuel injection control system for an engine, for calculating a command injection pulse time for which a fuel injector is to inject fuel on the basis of a fuel injection quantity and a fuel injection pressure, which are determined according to the operating condition of the engine or operating conditions for the engine, and for driving the fuel injector according to the calculated command injection pulse time, the system comprising:

(a) an injection quantity determining means for calculating a learning control mode injection quantity according to the operating condition of the engine when learning executing condition dependent on a predetermined operating condition of the engine or the operating conditions are valid;

(b) a uniform split injection time correcting means for dividing learning control mode injection quantity set by the injection quantity determining means substantially uniformly for n injection cycles while the n injection cycles are performed, for achieving inter-cylinder engine speed variation correction to smooth inter-cylinder engine speed variations by measuring engine speed variation in each cylinder and comparing the measured engine speed variations in all the cylinders with the mean value of engine speed variations in all the cylinders, and for achieving mean engine speed correction to maintain the mean engine speed at a desired engine speed by measuring mean engine speed while the n injection cycles are performed, and comparing the mean engine speed with the desired engine speed;

(c) a first correction calculating means for calculating, for each cylinder, a first quantity correction corresponding to the deviation of a measured engine speed variation in each cylinder from the mean engine speed variation of engine speed variations in all the cylinders;

(d) a second correction calculating means for calculating a uniform second correction for all the cylinders necessary to maintain the mean engine speed at the desired engine speed;

(e) a learned value storage means for updating and storing a learned value for each cylinder obtained by adding up a value obtained by dividing the first correction for each cylinder by n, a value obtained by dividing the uniform second correction for all the cylinders by n, and a learned value obtained in a preceding control cycle;

a temporary learned value storage means that repeats a learning control operation for calculating the learned value, and updating and storing the learned value while the inter-cylinder engine speed variation correction and the mean engine speed correction are being carried out, and updates and stores a plurality of temporary learned values calculated by repeating the learning control operation a plurality of times; and a learned value calculating means that determines the learned value to be calculated under the predetermined operating condition of the engine by subtracting a change in an engine injection quantity requirement set according to load on the engine and the variation of combustion condition from the sum of the first injection quantity correction and the second injection quantity correction or adding the same to the sum of the first injection quantity correction and the second injection quantity correction.

9. A fuel injection control system for an engine, for calculating a command injection pulse time for which a fuel injector is to inject fuel on the basis of a fuel injection quantity and a fuel injection pressure, which are determined according to the operating condition of the engine or operating conditions for the engine, and for driving the fuel injector according to the calculated command injection pulse time, the system comprising:

(a) an injection quantity determining means for calculating a learning control mode injection quantity according to the operating condition of the engine when learning executing conditions dependent on a predetermined operating condition of the engine or the operating conditions are valid;

(b) a uniform split injection time correcting means for dividing learning control mode injection quantity set by the injection quantity determining means substantially uniformly for n injection cycles while the n injection cycles are performed, for achieving inter-cylinder engine speed variation correction to smooth inter-cylinder engine speed variations by measuring engine speed variation in each cylinder and comparing the measured engine speed variations in all the cylinders with the mean value of engine speed variations in all the cylinders, and for achieving mean engine speed correction to maintain the mean engine speed at a desired engine speed by measuring mean engine speed while the n injection cycles are performed, and comparing the mean engine speed with the desired engine speed, (c) a first correction calculating means for calculating, for each cylinder, a first quantity correction corresponding to the deviation of a measured engine speed variation in each cylinder from the mean engine speed variation of engine speed variations in all the cylinders;

(d) a second correction calculating means for calculating a uniform second correction for all the cylinders necessary to maintain the mean engine speed at the desired engine speed; and (e) a learned value storage means for updating and storing a learned value for each cylinder obtained by adding up a value obtained by dividing the first correction for each cylinder by n, a value obtained by dividing the uniform second correction for all the cylinders by n, and a learned value obtained in a preceding control cycle, wherein the present learning control cycle after the validation of the learning executing conditions is started from a learning state at a time when the preceding learning control cycle is suspended, when the preceding learning control cycle is suspended due to the invalidity of the learning executing conditions.

10. A fuel injection control system for an engine, for calculating a command injection pulse time for which a fuel injector is to inject fuel on the basis of a fuel injection quantity and a fuel injection pressure, which are determined according to the operating condition of the engine or operating conditions for the engine, and for driving the fuel injector according to the calculated command injection pulse time, the system comprising:

(a) an injection quantity determining means for calculating a learning control mode injection quantity according to the operating condition of the engine when learning executing conditions dependent on a predetermined operating condition of the engine or the operating conditions are valid;

(b) a uniform split injection time correcting means for dividing learning control mode injection quantity set by the injection quantity determining means substantially uniformly for n injection cycles while the n injection cycles are performed, for achieving inter-cylinder engine speed variation correction to smooth inter-cylinder engine speed variations by measuring engine speed variation in each cylinder and comparing the measured engine speed variations in all the cylinders with the mean value of engine speed variations in all the cylinders, and for achieving mean engine speed correction to maintain the mean engine speed at a desired engine speed by measuring mean engine speed while the n injection cycles are performed, and comparing the mean engine speed with the desired engine speed;

(c) a first correction calculating means for calculating, for each cylinder, a first quantity correction corresponding to the deviation of a measured engine speed variation in each cylinder from the mean engine speed variation of engine speed variations in all the cylinders;

(d) a second correction calculating means for calculating a uniform second correction for all the cylinders necessary to maintain the mean engine speed at the desired engine speed;

(e) a learned value storage means for updating and storing a learned value for each cylinder obtained by adding up a value obtained by dividing the first correction for each cylinder by n, a value obtained by dividing the uniform second correction for all the cylinders by n, and a learned value obtained in a preceding control cycle; and a pilot injection quantity controller that drives the fuel injector a plurality of times while the engine is in a compression stroke, wherein the pilot injection quantity controller includes a learned value reflecting means for reflecting the learned value stored by the learned value storage means in the calculation of injection quantities, set according to the operating condition of the engine and the fuel injection quantity, respectively for pilot injection, main injection, after injection and post injection.

11. A fuel injection control system for an engine, for calculating a command injection pulse time for which a fuel injector is to inject fuel on the basis of a fuel injection quantity and a fuel injection pressure, which are determined according to the operating condition of the engine or operating conditions for the engine, and for driving the fuel injector according to the calculated command injection pulse time, the system comprising:

(a) an injection quantity determining means for calculating a learning control mode injection quantity according to the operating condition of the engine when learning executing condition dependent on a predetermined operating condition of the engine or the operating conditions are valid;

(b) a uniform split injection time correcting means for dividing learning control mode injection quantity set by the injection quantity determining means substantially uniformly for n injection cycles while the n injection cycles are performed, for achieving inter-cylinder engine speed variation correction to smooth inter-cylinder engine speed variations by measuring engine speed variation in each cylinder and comparing the measured engine speed variations in all the cylinders with the mean value of engine speed variations in all the cylinders, and for achieving mean engine speed correction to maintain the mean engine speed at a desired engine speed by measuring mean engine speed while the n injection cycles are performed, and comparing the mean engine speed with the desired engine speed;

(c) a first correction calculating means for calculating, for each cylinder, a first quantity correction corresponding to the deviation of a measured engine speed variation in each cylinder from the mean engine speed variation of engine speed variations in all the cylinders;

(d) a second correction calculating means for calculating a uniform second correction for all the cylinders necessary to maintain the mean engine speed at the desired engine speed;

(e) a learned value storage means for updating and storing a learned value for each cylinder obtained by adding up a value obtained by dividing the first correction for each cylinder by n, a value obtained by dividing the uniform second correction for all the cylinders by n, and a learned value obtained in a preceding control cycle; and an idling fuel consumption detecting means detects an idling fuel consumption state, and a false learning detecting means detects false learning, wherein the learning executing conditions are valid when the idling fuel consumption detecting means detects an idling fuel consumption state and the false learning detecting means detects false learning or when the frequency of an ignition switch opening operation, the distance traveled by a vehicle, the operating time of the engine or the secular change of injection quantity meets predetermined conditions.

12. The fuel injection control system for an engine according to claim 11, further comprising a learned value calculating frequency changing means for properly changing the frequency of calculation of the learned value or the frequency of correction of the learned value according to the frequency of an ignition switch opening operation, the distance traveled by a vehicle, the operating time of the engine or the secular change of injection quantity.

13. A fuel injection control system for an engine, for calculating a command injection pulse time for which a fuel injector is to inject fuel on the basis of a fuel injection quantity and a fuel injection pressure, which are determined according to the operating condition of the engine or operating conditions for the engine, and for driving the fuel injector according to the calculated command injection pulse time, the system comprising:

(a) an injection quantity determining means for calculating a learning control mode injection quantity according to the operating condition of the engine when learning executing conditions dependent on a predetermined operating condition of the engine or operating conditions for the engine are valid;

(b) a uniform split injection quantity correcting means for substantially uniformly dividing the learning control time injection quantity by n while n split injection cycles are performed, for achieving inter-cylinder engine speed variation correction for individually correcting injection quantities for cylinders to smooth engine speed variation in each cylinder by measuring engine speed variation in each cylinder and comparing the engine speed variations in all the cylinders with a mean value, and for achieving mean engine speed correction by measuring the mean engine speed while the n injection cycles are performed, comparing the mean engine speed with a desired engine speed, and uniformly correcting the injection quantities for all the cylinders so that the mean engine speed is maintained at the desired engine speed for mean engine speed correction;

(c) a first correction calculating means for calculating, for each cylinder, a first injection quantity correction corresponding to the deviation of a measured engine speed variation in each cylinder from a mean engine speed variation of engine speed variations in all the cylinders;

(d) a second correction calculating means for calculating a uniform second injection quantity correction for all the cylinders necessary to maintain the mean engine speed at the desired engine speed; and (e) a learned value storage means for updating and storing a learned value for each cylinder obtained by adding up a value obtained by dividing the first injection quantity correction for each cylinder by n, a value obtained by dividing the uniform second injection quantity correction for all the cylinders by n, and a learned value obtained in a preceding control cycle.

14. The fuel injection control system for an engine, according to claim 13, wherein the learned value indicates a deviation of an actual injection quantity from the command injection pulse time for which a fuel injector is to inject fuel for each fuel injection pressure and each cylinder of the engine.

15. The fuel injection control system for an engine, according to claim 13, further comprising:

a temporary learned value storage means for repeating a learning control operation for calculating the learned value, and updating and storing the learned value while the inter-cylinder engine speed variation correction and the mean engine speed correction are being carried out, and for updating and storing a plurality of temporary learned values calculated by repeating the learning control operation a plurality of times;

wherein a minimum value for a fuel injection pressure and for each cylinder among the temporary learned values is used as a final learned value.

16. The fuel injection control system for an engine, according to claim 13, further comprising:

a false learning detecting means for detecting false learning, wherein the false learning detecting means gives a command to repeat the learning control operation from the beginning when the uniform second injection quantity correction for all the cylinders is smaller than a predetermined value under a condition other than the learning executing conditions.

17. The fuel injection control system for an engine, according to claim 13, further comprising:

a false learning detecting means for detecting false learning, wherein the false learning detecting means does not store a learned value obtained by the present learning control cycle and starts the learning control cycle from the beginning when the difference between a learned value obtained by the preceding learning control cycle and that obtained by the present learning control cycle is outside a predetermined range or when an integrated learned value is greater than a predetermined value.

18. The fuel injection control system for an engine, according to claim 13, further comprising:

a false learning detecting means for detecting false learning;

wherein the false learning detecting means provides a command requesting inhibition or suspension of the learning control operation upon the increase of the uniform second injection quantity correction for all the cylinders from the start of the learning control operation by a value greater than a predetermined value.

19. The fuel injection control system for an engine, according to claim 13, further comprising a learned value correcting means that uses a value obtained by tempering the learned value or the temporary learned value with a correction coefficient serving as a measure of the characteristics of a fuel injection system as a learned correction.

20. The fuel injection control system for an engine, according to claim 13, further comprising a learned value calculating means for determining the learned value or the temporary learned value to be calculated under the predetermined operating condition of the engine by subtracting a change in an engine injection quantity requirement set according to load on the engine and the variation of combustion condition from the sum of the first injection quantity correction and the second injection quantity correction or adding the same to the sum of the first injection quantity correction and the second injection quantity correction.

21. The fuel injection control system for an engine, according to claim 13, wherein the present learning control cycle after the validation of the learning executing conditions is started from a learning state at a time when the preceding learning control cycle is suspended, when the preceding learning control cycle is suspended due to the invalidity of the learning executing conditions.

22. The fuel injection control system for an engine, according to claim 13, further comprising:

a pilot injection quantity controller that drives the fuel injector a plurality of times while the engine is in a compression stroke;

wherein the pilot injection quantity controller includes a learned value reflecting means for reflecting the learned value stored by the learned value storage means in the calculation of injection quantities, set according to the operating condition of the engine and the fuel injection quantity, respectively for pilot injection, main injection, after injection and post injection.

23. The fuel injection control system for an engine according to claim 13, wherein the first and the second correction calculating means calculate the first injection quantity correction for each cylinder and the uniform second injection quantity correction for all the cylinders for a plurality of different fuel injection pressure levels, and the learned value storage means updates and stores learned values for the plurality of different fuel injection pressure levels.

24. The fuel injection control system for an engine according to claim 23, further comprising a learned value reflecting means for reflecting the learned values for the plurality of different fuel injection pressure levels stored by the learned value storage means as corrections in the calculation of the fuel injection quantity for each cylinder;

wherein the learned value reflecting means determines learned values for fuel injection pressure levels other than the plurality of different fuel injection pressure levels by interpolation.

25. The fuel injection control system for an engine, according to claim 13, further comprising:

an idling fuel consumption detecting means for detecting an idling fuel consumption state, and a false learning detecting means for detecting false learning;

wherein the learning executing conditions are valid when the idling fuel consumption detecting means detects an idling fuel consumption state and the false learning detecting means detects false learning or when the frequency of an ignition switch opening operation, the distance traveled by a vehicle, the operating time of the engine or the secular change of injection quantity meets predetermined conditions.

26. The fuel injection control system for an engine, according to claim 25, further comprising a learning value calculation frequency changing means for properly changing the frequency of learned value calculation or the frequency of correction so that learned value calculation or correction is executed at a proper frequency according to the frequency of an ignition switch opening operation, the distance traveled by a vehicle, the operating time of the engine, the secular change of injection quantity or the secular deterioration of a fuel injector.

* * * * *